(12) United States Patent
Rana et al.

(10) Patent No.: US 11,282,013 B2
(45) Date of Patent: Mar. 22, 2022

(54) MOBILE VEHICLES IN MANUFACTURING

(71) Applicant: HEXAGON TECHNOLOGY CENTER GMBH, Heerbrugg (CH)

(72) Inventors: Asif Rana, Widnau (CH); Bernd Reimann, Heerbrugg (CH); Alexandre Heili, Altstätten (CH); Silvan Meile, St.Gallen (CH); Alexandar Mavrov, Piossasco (IT); Markus Steiner, Gränichen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/734,925

(22) PCT Filed: Jun. 7, 2019

(86) PCT No.: PCT/EP2019/065042
§ 371 (c)(1),
(2) Date: Dec. 3, 2020

(87) PCT Pub. No.: WO2019/234249
PCT Pub. Date: Dec. 12, 2019

(65) Prior Publication Data
US 2021/0232989 A1    Jul. 29, 2021

(30) Foreign Application Priority Data
Jun. 8, 2018   (EP) ..................................... 18176799

(51) Int. Cl.
*G06Q 10/06* (2012.01)
*G05B 19/418* (2006.01)
*G06Q 50/04* (2012.01)

(52) U.S. Cl.
CPC ... G06Q 10/0633 (2013.01); G05B 19/41895 (2013.01); G06Q 10/06393 (2013.01); G06Q 50/04 (2013.01)

(58) Field of Classification Search
CPC ........... G06Q 10/00–50/00; G05B 1/00–24/00
(Continued)

(56) References Cited

U.S. PATENT DOCUMENTS 7,735,060 B2 * 6/2010 Harvey ..................... G06F 8/61
                                                           717/107
9,452,533 B2 * 9/2016 Calkins .................. B25J 9/1692
(Continued)

FOREIGN PATENT DOCUMENTS

CA        1234419       3/1988
CN     107817787 A      3/2018
(Continued)

OTHER PUBLICATIONS

Gosar, Žiga, et al. "A Reconfigurable Robot Workcell in the Automotive Industry." https://barr.ai/papers/gosar-ReconfigurableRobotWorkcell2017.pdf (Year: 2017).*
(Continued)

*Primary Examiner* — Alan S Miller
(74) *Attorney, Agent, or Firm* — Maschoff Brennan

(57) ABSTRACT

A system comprising at least one mobile vehicle configured to move autonomously. The mobile vehicle comprises a spatial localization system, an autonomous navigation and propulsion unit, a local edge computation unit for a local data analysis at the mobile vehicle by intelligent, dynamically deployable edge analytics software agents, and a communication interface providing a data link to other devices. The system utilizes an automatic deployment of a workflow comprising at least one current task. A mobile measurement vehicle with a spatial measurement sensor unit (Continued)

is configured to establish a temporary instance of a local spatial reference cell for a subset of multiple mobile vehicles and a work piece. The temporary instance of the spatial reference cell is established temporally and is established with an individual level of spatial accuracy and individual limited local range, which individual level is dynamically defined by an accuracy requirement of the current task.

18 Claims, 5 Drawing Sheets

(58) Field of Classification Search
USPC .................................................. 705/7.11–7.42
See application file for complete search history.

(56) References Cited

U.S. PATENT DOCUMENTS

| | | | |
|---|---|---|---|
| 9,612,436 B1 | 4/2017 | Hoffman | |
| 9,892,744 B1* | 2/2018 | Salonidis | G10L 25/51 |
| 2002/0038159 A1* | 3/2002 | Gass | G05B 19/4183 |
| | | | 700/108 |
| 2008/0005287 A1* | 1/2008 | Harvey | G06F 8/20 |
| | | | 709/220 |
| 2008/0010631 A1* | 1/2008 | Harvey | G06F 8/36 |
| | | | 717/131 |
| 2011/0043515 A1* | 2/2011 | Stathis | G06T 17/00 |
| | | | 345/419 |
| 2014/0267234 A1* | 9/2014 | Hook | G06T 19/006 |
| | | | 345/419 |
| 2014/0285486 A1* | 9/2014 | Chang | G06T 17/00 |
| | | | 345/420 |
| 2015/0253766 A1* | 9/2015 | Pettersson | G05B 19/41805 |
| | | | 700/168 |
| 2016/0216974 A1 | 7/2016 | Hanebutte | |
| 2016/0257000 A1* | 9/2016 | Guerin | B25J 9/1605 |
| 2016/0271796 A1* | 9/2016 | Babu | B25J 11/0075 |
| 2017/0023906 A1 | 1/2017 | Ikeda | |
| 2017/0060574 A1 | 3/2017 | Malladi et al. | |
| 2017/0090989 A1* | 3/2017 | van Velzen | G06F 8/70 |
| 2017/0222999 A1 | 8/2017 | Banga | |
| 2017/0235603 A1 | 8/2017 | Baughman | |
| 2017/0285664 A1* | 10/2017 | Wang | B64D 45/00 |
| 2018/0285052 A1* | 10/2018 | Eade | G03H 1/0005 |
| 2019/0049975 A1* | 2/2019 | Kattepur | G06Q 10/087 |
| 2019/0174207 A1* | 6/2019 | Cella | H04L 67/12 |
| 2019/0179282 A1* | 6/2019 | Gotz | G05B 19/0428 |
| 2020/0097006 A1* | 3/2020 | Liu | G06T 7/579 |
| 2021/0232989 A1* | 7/2021 | Rana | G06Q 50/04 |

FOREIGN PATENT DOCUMENTS

| | | |
|---|---|---|
| EP | 1171752 | 1/2002 |
| EP | 1890168 | 2/2008 |
| EP | 2033088 | 3/2009 |
| EP | 2033089 | 3/2009 |
| EP | 2191388 | 6/2010 |
| EP | 3156898 | 4/2017 |
| EP | 3220163 | 9/2017 |
| EP | 3521781 | 8/2019 |
| EP | 3522003 A | 8/2019 |
| EP | 3522015 A | 8/2019 |
| KR | 10-2017-0112937 A | 10/2017 |
| WO | 2017/16570 | 2/2017 |
| WO | 2017/165708 | 9/2017 |

OTHER PUBLICATIONS

Wilcox, Ronald, and Julie Shah. "Optimization of multi-agent workflow for human-robot collaboration in assembly manufacturing." Infotech@ Aerospace 2012. 2012. 2535. (Year: 2012).*
European Search Report dated Dec. 12, 2018 as received in Application No. 18176799.7.

* cited by examiner

MOBILE VEHICLES IN MANUFACTURING

CROSS-REFERENCE TO RELATED APPLICATIONS

This application claims priority to European Patent Application No. 18176799.7, filed on Jun. 8, 2018. The foregoing patent application are incorporated herein by reference.

FIELD OF THE INVENTION

The present invention relates generally to a system comprising multiple mobile vehicles in a manufacturing environment according to the preamble of claim 1, as well as to a corresponding method, device and computer program product.

The present invention in particular relates to a deployment of intelligent solutions to diverse types of production lines, in particular for the task of smart and adaptive quality control during the production process at a production line in a smart factory environment. The invention can be applied to any type of production line. The most common type is for example a production line where the manufactured goods are moved around in-between different manufacturing stages, like on a conveyor belt or on moving vehicles. Another scenario in the scope of the invention is that of a manufacturing of static parts, where the manufactured goods stay substantially at a certain location and tools and parts are moved to this location, like in the manufacturing of an airplane, ship or construction of a building. Besides, there are also many hybrid forms of those approaches.

BACKGROUND

For the monitoring and quality control of the manufacturing, and for deriving statistics, reports and notifications, both interim results and also the end-product are measured with respect to their physical properties, whereof one of the most important is the geometry, and/or with respect to their functional behavior, such as e.g. routine testing, like in the European patent application NR. 18154500 or others. State-of-the-art industrial solutions are therein relying on fixed measurement protocols, typically involving static platforms performing measurements at specific, pre-determined stations of the manufacturing chain. Such can e.g. involve taking samples and checking them by dedicated coordinate measurement machines, either in-line with the production or in dedicated metrology rooms.

Some examples of known techniques can e.g. be found in US 2017/235603, US 2017/222999, US 2016/216974, US 2017/060574, WO 2017/16570, US 2017/023906, WO 2017/165708, EP 3 156 898, etc.

Nevertheless, the known approaches lack flexibility and scalability and are often complex to handle and have to be specifically programmed, re-programmed and adapted by skilled craftsmen, in particular in view of modifications or adaptions of product and/or processes, problems, failures, outages, etc. A rudimentary use of mobile vehicles for various tasks in a manufacturing environment is not unknown, but those are only capable of simple autonomous navigation and movement in their environment. Such autonomous navigation approaches generally lack high spatial accuracy. Autonomous navigation of mobile vehicles can be part of the present invention, but the present invention goes far beyond by establishing a smart factory environment with highly intelligent, flexible and self-learning workflows in which process optimization is carried out by leveraging machine learning based approaches.

SUMMARY

It is therefore an object of some aspects of the present invention to improve a prior art manufacturing environment with intelligent mobile vehicles. It is an object to provide methods, systems and/or devices for improved, more flexible manufacturing of work pieces. A special objective can therein be to autonomously achieve the desired spatial referencing accuracy required for the various tasks, preferably within a short time and in a flexible way. All of this should be done in a smart factory environment, sometimes also referred to as industry 4.0. Such a smart factory environment according to the invention comprises Cyber-Physical Systems (CPS), Industrial Internet of Things (IIoT) devices, networked sensors, advanced robotics, edge-, fog- and cloud-services as well as the according infrastructure and software agents, which are all networked by a sophisticated and flexible communication network infrastructure, which is seamlessly bridging between wired and wireless communication, depending on the actual demand. The networking infrastructure is therein provided for downstream as well as upstream services, in horizontal as well as in vertical direction. Open communication and protocols, which are flexible and preferably dynamically extensible, can therein play an important role to achieve machine-machine as well as machine-human collaboration. For example, an embedded manufacturing system can be vertically networked with a business process within factories and enterprises but also horizontally connected to dispersed value networks that can be managed in real time. Such not only enables an end-to-end digital integration of engineering across the entire value chain, but also dynamic business and engineering processes that can also be automated to high degree by utilizing intelligent agents which are distributed or deployed across the factories and enterprises. Those intelligent agents are not only providing assistance in optimized decision-making, responding flexibly to disruptions or failures, etc. but can also comprise continuously refining machine learning algorithms, which are interlinked and aware of each other and can autonomously deploy new or improved machine learned strategies to be available for other, similar problems at another agent. Hand-in-hand there is also a multilevel cyber security system with a deployment of integrated safety and security architectures, unique identifiers, encryption, decryption, digital signing, checksums, blockchain, etc. which can assure that the overall automated system is healthy and not infiltrated or hacked.

The present invention therein does not promote a workerless-factory but a socio-technical approach, where human workers are present in the factory in a participative work design. By the intelligent agent system, a human machine cooperation by so-called collaborative robots or cobots (like a Franka Emika Robot, a Baxter robotic platform or others), without strictly segregating robots from humans. In particular, augmented reality (AR)-, virtual reality (VR)- or mixed reality (MR)-systems can be utilized as means for an efficient human-machine interaction. The invention is therein preferably comprising a configurable, flexible combination of intelligent edge-computing for substantially real time demands, as well as fog-computing and/or cloud-computing for providing big data processing capabilities. By such a distributed approach with big data analytics or cloud analytics, concerning velocity, variety and volume, the smart manufacturing can transform from reactionary and statistical practices to predictive ones. Therein, smart machines with edge intelligence systems can operate autonomously, communicate directly with the relevant partners, solve problems and make decisions in many cases independently of humans and can complete work beyond their initial basic programming, e.g. by their artificial intelligence systems automatically harvesting additional capabilities from other entities at the plant or from previously learned experiences.

The present invention therein not only applies to real world factories but also to collaborative virtual factory (VF) platforms, which means to processes in a design and planning phase of a production. By employing the present invention already to complete simulation and virtual testing scenarios throughout the whole product lifecycle, e.g. machine learning approaches can already be applied to training data derived from simulation, numerically rendered images and 3D models, etc.—resulting in well-trained artificial intelligence systems right from the start of the production, without having to pre-gather real world training data, but only by refining the pre-trained artificial intelligence systems with real-world data on the fly, during the start or ramping up the production, as well as during the whole production cycle.

Those objects are achieved by realizing the features of the independent claims. Features which further develop the invention in an alternative or advantageous manner are described in the dependent patent claims.

The invention relates to a system comprising at least one mobile vehicle, configured to move autonomously in a smart factory environment at which a work piece is processed. The mobile vehicle therein at least comprises a spatial localization system for deriving a location of the mobile vehicle in the manufacturing environment, an autonomous navigation and propulsion unit configured for providing mobility of the mobile vehicle in the manufacturing environment. The mobile vehicle also comprises a communication interface providing a data link to at least one other mobile vehicle and/or to a fog- and/or cloud-computation and storage system, in particular configured for cloud analytics which can comprise an analysis by big data processing. The fog- and/or cloud-computation and storage system can be embodied as stationary computation and storage system external from the mobile vehicle, for example located on-site or off-site of the manufacturing environment, and can comprise at least a computation and data storage unit and a data link to a manufacturing environment network. The data link can therein e.g. be established directly in-between the mobile vehicles for direct interaction of the vehicles and/or swarm intelligence, indirectly via a common gateway, hub or control system, or exclusively or optionally by central fog- and/or cloud computation unit. Preferably there will be a (at least partially dynamically auto-chosen) mixture of those data links. An edge computation unit comprised at the mobile vehicle is configured for a local data analysis at the mobile vehicle by intelligent, deployable edge analytics software agents. The edge computation unit at the mobile vehicle can comprises a central processing unit, a memory and program code configured for a local data analysis at the mobile vehicle, in particular of data derived by the mobile vehicle and of data derived from the task information and from the manufacturing environment. Derived by interaction of the communication interface of the edge computation unit with the manufacturing environment network. This local data analysis can preferably be established by intelligent, deployable edge analytics software agents, comprising at least one program-code-module configured to be transferred by the manufacturing environment network and to be executes by the edge client, preferably in real time by a stream analytics agent at the edge computation unit which is configured to compute real time analysis on an online stream of data at the manufacturing environment network. Such edge analytics software agents can e.g. also be deployable via the communication interface from the at least one other mobile vehicle and/or the fog- and/or cloud-computation and storage system. The edge computation unit can therein at least partially operate in real time and/or by a stream analytics agent, and can be configured to interact with the at least one other mobile vehicle and/or the fog- and/or cloud-computation and storage system via the communication interface. The invention can comprise an automatic deployment of a workflow information for the processing of the work-piece for the at least one mobile vehicle, which workflow comprises at least one current task. In particular, the workflow information can transferred via the manufacturing network environment and can be embodied as a set of data comprising a series of tasks which are comprising modification steps to be applied to the work piece. The current task of such a series of tasks can in particular explicitly or implicitly comprise a spatial dependency or spatial relation in-between the work piece and at least one external tool, component or probe provided by one of the multiple mobile vehicles and/or by the manufacturing environment. The spatial dependency can in particular be extracted in form of some relative spatial information that is comprised in the current task as a requirement.

At least one mobile vehicle is configured as a mobile measurement vehicle comprising at least one spatial measurement sensor unit. This mobile measurement vehicle is according to the invention configured to establish a temporary instance of a local spatial reference cell, which temporary instance of the spatial reference cell is established with data from the at least one spatial measurement sensor unit. This temporary instance of a local spatial reference cell can in particular be configured to establish a spatial reference frame for those of the mobile vehicles involved in the current task to be dimensionally referenced with respect to each other and/or with respect to portions of the manufacturing environment involved in the current task—in particular at least in those dimensions and/or accuracies which are required by the current task. The temporary instance of the spatial reference cell is therein established temporarily for a limited time of a duration of a current task that has to be established at the work piece. Preferably, the temporary instance of the spatial reference cell can only involve those mobile vehicles, work piece and/or objects which are mandatory required for the current task. The temporary instance of the spatial reference cell is established according to individual requirements of the current task that has to be established. Therein, the individual requirements of the current task can in particular be individual spatial or dimensional requirements that are explicitly comprised or implicitly derived from the current task by the edge computation unit. In particular, the temporary instance of the spatial reference cell can be automatically established based on capabilities of the mobile measurement vehicle, wherein the capabilities can be derived by a self-awareness and/or a self-reflection of the mobile measurement vehicle. Such self-awareness and/or a self-reflection can comprises a list of parameters of capabilities or functionalities of the mobile vehicle at which the edge computation unit resides on, for which a self-reflection edge analytics agent at the edge computation unit at the mobile vehicle calculates a comparison with those, in particular spatial, requirements of the current task.

In a differently worded embodiment, the invention can relate to a system comprising multiple mobile vehicles which are configured to move autonomously in a smart factory environment, at which a work piece is processed. The mobile vehicles comprise at least
- a spatial localization system for deriving a location of the mobile vehicle in the manufacturing environment,
- an autonomous navigation and propulsion or drive unit configured for providing mobility of the mobile vehicle in the manufacturing environment,
- a local computation unit with a communication interface configured for establishing a data link to at least one of the other mobile vehicles and/or to a stationary network access point,
- an edge computation unit for a local data analysis at the mobile vehicle by intelligent, dynamically deployable edge analytics software agents, preferably in real time by stream analytics agent, and
- a communication interface providing a data link to other mobile vehicles and/or to a fog- and/or cloud computation and storage system, in particular for cloud analytics which can be done in non-real-time and/or in form of big data analytics.

Such an edge computation unit, also referred to as edge client (EC), can in particular comprise several agent modules connected together, e.g. using a service bus or a system and data integration software such as EdgeFrontier (EF) of Intergraph Corporation. Some examples of such integration tools to be used with the application can e.g. be found in EP 3 156 898, US 2008/0005287, US 2008/0010631 or U.S. Pat. No. 7,735,060. The invention therein provides an extensible IIoT edge solution, process automation, secure edge connectivity and dynamically changeable workflows. Such edge clients can be configured as networked computation nodes comprising a storage with program code (e.g. embodied as embedded firmware), and/or a communication interface (such as a network interface) to access program code and/or configuration data for the edge client which is at least partially stored at a remote storage device, e.g. in the cloud or fog. Besides program code and/or configuration data the network interface is also configured to transfer digital data in form of messages, commands, datagrams, datasets, queries, images, data or video streams, JSON-, BSON-, YAML-, OGDL-, CSV-, XML-data, etc. In an exemplary embodiment, a system according to the invention can provide extension for edge intelligence platforms to sense and provide data and services to a user or to a cloud computation unit or to a management agent, by means of several software agents that can be provided in agent modules connected to devices and connected together using a service bus.

The invention also comprises an automatic deployment of a workflow for the processing of the work-piece across multiple of the mobile vehicles, which work flow comprises at least one current task. Therein, a single and/or different tasks of the workflow are automatically deployed in a collaborative workflow across multiple of the mobile vehicles, in particular wherein a second of the mobile vehicles can functionally substitute a first of the mobile vehicles which fails, or is occupied and/or hindered in establishing the current task—or wherein a second of the mobile vehicles provides improved capabilities for fulfilling the current task compared to a first of the mobile vehicles.

In the system, at least one of the mobile vehicles is configured as a mobile measurement vehicle comprising at least one spatial measurement sensor unit, which mobile measurement vehicle is configured to establish a temporary instance of a local spatial reference cell for a subset of at least one of the multiple mobile vehicles and the work piece, which temporary instance of the spatial reference cell is established with data from the at least one spatial measurement sensor unit. The temporary instance of the spatial reference cell is established temporarily for a limited time of a duration of a current task that has to be established by the subset of mobile vehicles at the work piece and the temporary instance of the spatial reference cell is established according to individual requirements of the current task that has to be established by the subset of mobile vehicles.

In the system a transfer learning mechanism can be established between agent modules and/or edge clients at a plurality of the mobile vehicles and/or in-between the edge client at one of the mobile and a fog- and/or cloud computation system. The transfer learning can e.g. comprise a learning based on data from a first mobile vehicle, a storage of a thereby learned knowledge, and a deployment of the stored knowledge to the second mobile vehicle, in particular dynamically when the second mobile vehicle is confronted with a different but related problem. Such can in particular be applied to a Deep-Learning implementation, for example by a transfer and adaption of the knowledge in form of a machine learned model or in form of a neural network or of a dedicated portion of a neural network. A transfer can in particular be established among or in-between
- a first factory or factory line and a second factory or factory line;
- a first work piece and a second, similar but different work piece;
- a first mobile measurement vehicle and a second equal or similar mobile measurement vehicle;
- a first task to be autonomously established and a second task to be autonomously established;
- etc.

An information derived at the mobile vehicle can be locally processed at the edge computation unit by a stream analytics agent, wherein a limited portion of the information which is significant for real-time operation of the mobile vehicle can be processed locally at the mobile vehicle by an edge analytics agent, and wherein substantially all or a defined subset of the information can be transferred into the cloud computation system to be processed by a big-data cloud analytics agent at the cloud computation system.

Therein, the stream analytics agent is configured to filter the limited portion of the information, in particular wherein the limited portion is defined by a filtering which is dynamically configured for providing specific, preferably pre-processed information to one or more edge client agents which are presently active at the edge computation unit and also dependent on the current task. The edge analytics agent processes the active edge client agents in real time or near real time to derive actions on basis of this limited portion of the information. The stream analytics agent also transfers a defined subset of the information, which is in general larger than the limited portion, to the cloud system, in which cloud system computationally intense cloud analytics agents are deriving non-real-time critical sophisticated decisions and optimizations for the manufacturing environment on basis of this defined subset of information, a cloud stored information history, business and management data, etc., in particular wherein the agents comprise machine-learning capabilities for unsupervised learning, supervised learning and reinforcement learning like principal component analysis, clustering, density estimation, classification—with e.g. support vector machines, random forests, neural networks—linear and nonlinear regression, etc.

According to the present invention, a dynamic quality control process can be provided in a smart manufacturing environment. Such a smart connected factory environment can be embodied as a centralized location or plant or at geographical distributed locations, at which work pieces, items, products or services are processed. To be processed can therein in particular refer to tasks and workflows comprising at least one of being e.g. made, manufactured, produced, fabricated, established, assembled, measured, qualified, tested, stored, packaged, distributed, repaired, recycled, disposed, dispatched, logistically processed, delivered, sorted, etc. In an example of an embodiment in this context, a task like e.g. an inspection task is no longer invariably determined, but can be done in a flexible and dynamically adapted way, in particular flexibly based on actual demand in the manufacturing environment.

For example, insights from advanced analytics algorithms of the manufacturing process can be leveraged to perform adaptive measurements, e.g. like scanning, probing, image acquisition, etc.; and/or to carry out appropriate actions, e.g. like machining, sending a part to another workspace, etc.; when qualified. For example, a measurement platform needs not to be stationary at certain location and/or stage of manufacturing, but is provided in form of a mobile vehicle, which can provide its measurement capabilities at arbitrary locations and/or stages of the manufacturing, which arbitrary location and/or stage can be designated and changed on current demand in the manufacturing environment. For example, such analytics algorithms can comprise:

statistical quality control demands,
remaining useful life estimation of tools and machinery,
analysis of process key performance indicators (KPIs) such as yield, uptime, failure rate, etc., and/or of product quality parameters, and/or of data from devices, machinery and involved working and service personal, to identify, quantify and improve effectiveness and/or efficiency of production and/or measurement workflows
comparison of product states, like "as designed", "as planned", "as built", and "as measured", with all relevant information being collected in a data lake,
data mining on random samples,
cyclic calibration or re-calibration of machines,
etc.

Also, product adaptations in a flexible manufacturing environment can trigger certain tasks in order to achieve a seamless adaption to a new product or to a certain product variant in the manufacturing environment.

By doing so, a level of autonomy of one or multiple automated production lines or of a complete factory can be increased. As a system according to the present invention is configured with the ability to adapt to unrehearsed situations, autonomy and flexibility of the production can be increased. As another aspect, the required resources for measurements and/or quality control can be reduced while maintaining or increasing productivity and quality of the produced goods, since the resources according to the invention are more flexible in their usage.

In an embodiment according to the present invention, a deviation of the real-world work piece from the required properties can be detected by the machine learned system according to a measurement. This machine learned system can autonomously trigger a corresponding action as learned, e.g. a re-measurement by a more sophisticated and accurate sensor unit, e.g. by a mobile CMM or by ordering a bot to bring the work piece to a stationary CMM, which CMMs are also automatically deployed with a corresponding task for measuring the deviating feature. Another action could be an automated adjustment of the production machinery responsible for this deviation in order to optimize the process and e.g. minimize the deviation. Another action can comprise a re-supplying of the deviating work piece back into a former stage in the production line. In particular, this re-supplying can comprise an automatically generated task to fix the deviating work piece, e.g. to re-machine the work piece or a specific portion of it, etc. Such an action can therein not only involve the edge computation units, but also higher level instances, a cloud system, etc.

An embodiment of the present invention comprises mobile platforms or vehicles taking part in the manufacturing process. In some embodiments those mobile platforms can be characterized by being embodied as automated ground vehicles (AGV) and/or unmanned aerial vehicles (UAV). Each of those vehicles can comprise at least one (preferably a multiplicity of) sensors and/or measurement devices. Such a sensor can be a sophisticated sensing unit or measurement device, like e.g. a tachymeter, theodolite, total station, laser scanner, laser tracker, measurement camera, stereo-camera, indoor GPS, mobile inline and/or standalone coordinate measurement machine (CMM), articulated arm, radar system, tactile probe, inertial measurement unit (IMU), code reader, tomography or X-ray sensor, white light sensor, etc.

Such a sensor can also be a lower level or bare sensor, e.g. a temperature sensor, camera, color sensor, weight sensor, inclination sensor, proximity or limit switch, electronic distance meters, surface roughness sensors, coating thickness sensors, search of light sensors, time of flight measuring system, etc.

The sensors can therein in particular be configured with a communication unit to establish a communication in-between the sensors as well as with an edge intelligence computation unit. The edge intelligence computation unit can in particular be configured for a self-reflection of the sensor, e.g. in view of its capabilities, limitations, accuracy, actual state, calibration, etc. The edge intelligence computation unit can in particular be configured to self-coordinate multiple of those intelligent sensors with each other, e.g. to automatically deploy, delegate or re-assign tasks dynamically upon demand. The present invention can in particular comprise a sensor data fusion in the evaluation of the sensors, in which data from different sensors and/or different modalities are analyzed in a combined manner, which can be done at edge level—e.g. at a single edge client, across multiple edge clients or at a cloud computing level.

The mobile platforms can also comprise at least one, preferably a multiplicity of actuators, like robotic arms to manipulate objects, perform machining actions, clean parts, heat or cool parts to a desired temperature for measurement and/or processing, repair, etc. screwing tools, rivet tools, welding tools, drilling tools, milling tools, painting tools, engraving tools, pick-and-place tools, marking tools, gluing tools.

The mobile platforms are therein configured to communicate with each other and/or with a factory level Process Control System or SCADA (Supervisory Control and Data Acquisition) System, for example via a network interface, like over an Industrial Internet of Things (IIoT) structure like in EP 2 033 088, EP 2 033 089, EP 2 191 388, EP 3 156 898, US 2008/0005287, US 2008/0010631, U.S. Pat. No. 7,735, 060 field busses or others.

The mobile platforms are therein configured to be highly autonomous and for example designed to be able to make decentralized decisions thanks to local computation units like edge-computing units or edge-clients providing local analytics agents in the field, like edge analytics or swarm intelligence. Therein, the mobile platforms can be configured to act as self-defining devices, which e.g. means that they are aware of their own capabilities and avail-abilities. Such a self-describing system (like in the application EP 18155183, EP 18155182, etc.) can e.g. reflect its types, data, capabilities, rules and workflows and can therefore be configured to take autonomous decisions within the framework of the production line or at factory level.

An integration of all the herein mentioned information can be used to implement a substantially automatic orchestration of algorithms, analytics, etc. whereby e.g. an automatic deployment of new workflows to specific systems can be established based on a present demand and state of the overall production line automatically derived from this information.

An embodiment of the orchestration and/or deployment can in particular comprise microservices. Such a service-oriented architecture with microservices comprises a decomposition of an application into different smaller services, whereby modularity can be improved, but it also has the effect that the application gets easier to understand, develop, test, and is resilient to architecture erosion—which are all advantageous effects in an embodiment of a flexible, automated orchestration that uses microservices. A usage of such microservices can increase their versatility across different tasks. The orchestration can therein comprise not only an automated generation of the workflow information but also a deployment of the microservices which are required to handle the workflow. The microservices can therein in particular be deployed temporarily and not be fixedly provisioned at a certain entity, e.g. also deployed in form of program code, containers, virtual machines or servers. The automated orchestration of the microservices can therein be highly specialized and customized in view of their application, time, location, etc. The microservices themselves can be designed to be decentralized and horizontally scalable, and can optionally also be protected by an authentication, authorization and/or cryptographic protection system.

An embodiment of the invention can also involve advanced analytics approaches, e.g. comprising technical aspects of analytics by the use of machine learning techniques like linear, logistic or nonlinear regression analysis, classification, decision trees, random forests, support vector machines and/or neural networks to do predictive modeling, as well as reinforcement learning and unsupervised machine learning techniques like cluster analysis, principal component analysis, segmentation profile analysis and association analysis.

Therein, each of the mobile platforms is thus configured to play the role of an orchestrator of many other systems, as it is configured with an ability to deploy workflows to other systems. In addition, there can also be an orchestration at a higher level, e.g. by a control center having access to all the data from the production line, in particular by advanced analytics and optimization in the cloud. There can also be an automated and/or autonomous delegation at the higher level (e.g. Cloud->AGV, fog->AGV, etc.), but also an autonomous delegation within a same level which is not explicitly ordered by a higher level, but negotiated directly among the factory level devices (e.g. AGV->AGV, UAV->AGV, etc.), e.g. depending on their availability and other scheduled tasks.

The present invention in particular relates to a system comprising multiple mobile vehicles configured to move autonomously in a manufacturing environment at which one or multiple types of work pieces are manufactured. The mobile vehicles therein comprise a spatial locating system for deriving a location of the mobile vehicle in the manufacturing environment and an autonomous navigation and drive unit configured for providing mobility of the mobile vehicle in the manufacturing environment. A local computation unit with a communication interface is configured for establishing a data link to at least one other of the mobile vehicles and/or to a stationary network access point. At least one of the mobile vehicles is therein configured as at least one mobile working vehicle, comprising at least one actuator tool and/or machining tool—like a handling, mounting, screwing, bolting, riveting, welding, pic-and-place, transportation, painting, etc. tool. At least one other of the mobile vehicles is therein configured as at least one mobile measurement vehicle, comprising at least one spatial measurement sensor unit, like laser tracker, laser scanner, measurement camera, structured light sensors, electronic distance meter or LIDAR, RIM-camera etc.

According to the invention, the mobile measurement vehicle is configured to establish a temporary instance of a local spatial reference cell for a subset of at least one of the multiple mobile vehicles and/or of the work piece. The spatial reference cell is therein established with data from the at least one spatial measurement sensor unit. The temporary instance of the spatial reference cell is established temporally for a limited time which is substantially corresponding to a duration of a task that has to be established by the subset of mobile vehicles at the work piece. The spatial reference cell is then dismissed after the execution of the task. The task is therein not the production of the whole work piece or an extensive chain of different tasks but a single, preferably atomic, singular or solitary task or step in manufacturing in a low order of a task hierarchy in the workflow. For example, applying one or more screws, fixing a constructional element, etc. but not a strongly sub-dividable task like assembling a chassis or engine of a car or assembling a whole computer starting from all basic components. In particular, the task can be in accord with a specific step or station at a conveyor belt, or can be a sub-step or micro-operation thereof. In an embodiment of the present invention such a task can in particular be a task that was not initially planned, but which is—e.g. based on data analysis by an edge or cloud agent—deemed necessary, for example to acquire more or more specific measurement data, or to act, repair, improve, re-machine the product, etc.

The temporary instance of the spatial reference cell is therein established with an individual level of spatial accuracy, wherein the individual level can be dynamically defined by an accuracy requirement of the actual task or step that has to be established. The temporary instance of the spatial reference cell is therein established with an individual local range, whose individual level can be dynamically defined by a geometric dependency of the actual task or step that has to be established by the subset of mobile vehicles. In particular, the duration, spatial accuracy and local dependencies can be automatically derived from the task by the local or by a production planning computation system.

The spatial measurement sensor unit can therein be embodied as a laser scanner, as a laser tracker, as a total station or as a measurement camera which is mounted at the mobile measurement vehicle. An embodiment of a mobile measurement vehicle according to the invention can also comprise a combination of a plurality of measurement sensor units, for example, with a laser tracker and an additional measurement sensor unit like a second laser tracker or a laser scanner. The spatial measurement sensor unit can in particular comprise an opto-electrical distance meter for a measurement light beam and a measurement system for deriving a direction of the measurement beam. A smart factory in the context of the present invention can in particular comprise, AGVs, UAVs and stationary machinery for measurement, mapping, inspection, machining, transportation, etc. Such mobile or stationary sensor vehicles or platforms, can in particular comprise LIDAR sensors, laser scanners, AEC scanners, levels, GNSS systems, GNSS reference networks, GIS collectors, total stations, line and point lasers, construction TPS & GNSS setups, measurement cameras, thermal cameras, CCTVs, mobile mapping systems, laser distance meters, GPR systems, radar systems, sensors for physical properties, switches, etc.—as well as according software, apps, microservices, storage services, cloud services, edge services, fog services, frontier services, configuration and orchestration interfaces, domain, situation and context awareness systems, artificial intelligence frameworks and services, machine learning frameworks and services, machine control systems, workflow management systems, data management systems, analytics systems, smart factory frameworks, etc. Measurement or surveillance equipment according to the invention in a smart factory environment can in particular comprise coordinate measurement machines (CMMs), portable articulated arm measurement machines, laser trackers, white light scanners, precision measuring instruments (like vernier gauges, calipers, micrometers, etc.), machine tool probes & sensors, automated measurement arms, but also according software tools like metrology software, statistical process control software, computer aided manufacturing (CAM) software, computer aided engineering software (CAE), etc. preferably combined and interacting in a highly automated smart quality, workflow and data management system in a smart factory setup according to the invention.

The mobile vehicle can also comprise a vision-based positioning and/or navigation, e.g. with a scan-matching, probability approach, particle-filters, landmark navigation, etc. The mobile measurement vehicle can also comprise other sensors, like barcode readers, NCF, RFID or other auto-ID technologies, sensors for identifying marks on the floor, IMU-based rough positioning, compass, indoor GNSS, WPS, WiPS, WFPS, RSSI, proximity sensors, limit switches, capacitive sensors, magnetic sensors, ultrasound sensors, odometers, etc.

The temporary spatial reference cell can therein be dynamically established by at least one of the mobile measurement vehicles, and can comprise a measured spatial information of at least one of the mobile working vehicles and of a measured spatial information of the work piece. The temporary spatial reference cell can also comprise a measured spatial information of a spatial reference in the manufacturing environment according to an additionally fixed spatial measurement sensor unit at the manufacturing environment or an optical reference mark at the manufacturing environment.

The local edge computation unit on any mobile vehicle can be configured for computing a movement trajectory for the mobile working vehicle and/or of its measurement tool, actuator tool or machining tool, based on the temporary spatial reference cell which is provided by the mobile measurement vehicle via its communication interface.

At least one of the mobile measurement vehicles can be embodied as an unmanned aerial vehicle (UAV), such as drones or planes. At least one of the mobile measurement vehicles can be embodied as an autonomous ground vehicle (AGV), comprising wheels, caterpillar tracks, legs or the like. In particular, an UAV's landing and recharging base can be an AGV.

An embodiment of the system can comprise at least a first and a second measuring vehicle, which are comprising different types of spatial measurement sensor units. For example, a laser tracker at the first and a laser scanner at the second mobile measuring vehicle. Therein the first measuring vehicle can establish the temporary local spatial referencing cell comprising spatial measurement information of the second measuring vehicle and optionally also of the work piece or the manufacturing environment. Measurement results of the spatial measurement sensor unit at the second mobile measuring vehicle can thereby be spatially referenced according to the temporary local spatial referencing cell established by the first mobile measurement vehicle. Some examples of spatial measurement sensor units can e.g. be found in EP 3220163, EP 1890168, EP 1171752, US 96/12436, CA 1234419, or others.

Accordingly, the invention also relates to a method for manufacturing a work piece within a manufacturing environment by a system comprising multiple autonomously moving mobile vehicles, in particular in a system as described herein. The method comprises an autonomous locating and navigating of the mobile vehicles in the manufacturing environment by a spatial localization system and a driving unit (e.g. for driving, flying, swimming, etc.), and a communicating with a local computing unit with an interface configured for establishing a data link to at least one other mobile vehicle and/or to a stationary network access point. According to the invention, at least one of the mobile vehicles is configured as a mobile working vehicle, which is comprising at least one tool for actuating and/or machining at the work piece. Also, at least one other of the mobile vehicles is configured as a mobile measuring vehicle comprising at least one spatial measuring sensor unit, which is preferably independent of the autonomous navigation system. According to the invention, the mobile measuring vehicle is temporarily establishing an instance of a local spatial reference cell for a subset of at least one of the multiple mobile working vehicles and/or for the work piece. This establishing comprises data from at least one measurement sensor unit of at least one of the mobile measurement vehicle. The establishing is therein temporally limited for a duration of a task that has to be performed by the subset of mobile vehicles at the work piece, which means that this spatial reference cell is thereafter dismissed and not maintained for a series of forthcoming tasks. The establishing is therein done with an individual level of spatial accuracy and individual local range. Therein, the individual level can be dynamically defined by an accuracy requirement of the task that has to be performed.

The spatial measurement sensor unit can therein be embodied as a laser scanner, as a laser tracker, as a measurement camera or as a total station mounted on the mobile measurement vehicle. In particular, the spatial measurement sensor unit can comprise an opto-electrical distance meter using a measurement light beam and measurement system for deriving a direction of the measurement beam.

The method can comprise an automatic evaluating of the task information by the local computation unit at the mobile vehicles. The local computation unit can therein be automatically calculating the individual level of spatial accuracy and the individual local range from an information dataset of the task derived from a manufacturing controlling computation unit via the communication interface. Such can comprise an automatic evaluation of the current task information by the local edge computation unit at the mobile vehicles based on a workflow information and a current state of the work-piece with a breaking down of the workflow information into a series of atomic tasks. The method can in particular comprise an automatic evaluating of at least one key performance indicator (KPI) in the manufacturing of the work piece (like a spatial accuracy requirement, a throughput requirement, a quality requirement, an availability requirement, a performance requirement and/or a utilization requirement) from the current task. According to this KPI there is a configuring of the temporal local spatial reference cell, and thereafter an enabling of an execution of the current task.

Therein, an automatic evaluation of an accuracy requirement for the task can be done. Then a configuration of the temporal local spatial reference cell can be done in order to achieve this accuracy requirement. When the reference cell is established with the desired accuracy, an execution of the task can be enabled via the communication interface.

An embodiment of the invention can comprise an automatic handing over or re-establishing of the local spatial reference cell from the at least one autonomously moving mobile vehicle to an at least one other autonomously moving mobile vehicle in case of a failing of the at least one autonomously moving mobile vehicle to establish or maintain the local spatial reference cell, in particular in a way to tune resilience and robustness of the system. For example, should a certain device or a vehicle constituting the temporary spatial reference cell fail, the system can be configured to provide significant fault-tolerance by dynamically and automatically re-establishing the temporary reference cell based on available capabilities of the remaining mobile vehicles.

Many of the concepts of the present invention are not strictly limited to illustratively chosen embodiment of achieving spatial accuracy in a smart factory environment with a plurality of mobile vehicles—as one specialization of a set of functionalities, but generally to the aspect of establishing and/or acquiring a required level of functionality through an (in some embodiments also abstracted) ensemble of the participating mobile sensors. Thereby, a desired meta entity can be dynamically created based on the capabilities of the devices in the manufacturing environment and the need of the current (atomic) task of the workflow which is at hand. According to the invention, such meta entities can in particular be created, deployed, disengaged, and expunged automatically without human intervention based on real-time process parameters and models learned from historical data with machine learning. In particular, such is not purely based only on a big centralized computation unit, but comprises a plurality of decentralized edge computation resources and flexibly deployable and intelligent software agents.

The invention also relates to an autonomous mobile vehicle comprising a spatial measurement sensor unit and a local computation unit configured for automatically establishing a temporary local spatial reference cell for at least one further mobile vehicle in a manufacturing environment, based on an information on a task to be established, in particular with an automatic orchestration of the required mobile vehicles for the task. For example, the autonomous mobile vehicle comprising a spatial measurement sensor unit can comprise a laser scanner and the further mobile vehicle can comprise a laser scanner whose scanning results are referenced according to the temporary local spatial reference cell.

A device or system according to the present invention comprises computation units, microcontrollers, microcomputers, DSPs, TPUs or programmable or hardwired digital logics, wherefore the present invention can involve a computer program product with program code being stored on a machine readable medium or embodied as an electromagnetic wave (such as e.g. a wired or wireless data signal), which implements functionality according to the invention at least partially in software—which therefore is also an embodiment of the invention. Such an approach is also referred to as edge computing, edge-client devices, edge client software or an edge client framework, in particular comprising support programs, compilers, code libraries, tool sets, application programming interfaces (APIs), microservice interfaces, virtualization interfaces, edge client agents, edge frontier agents, container management, deployment architectures, etc.

The computer program product comprises program code being configured to execute and operate mobile vehicles at a manufacturing environment. Specifically, the code can comprise instruction sets to automatically derive a temporary local spatial reference cell for tasks in a manufacturing process, with the computation of required accuracy and local dependency for the task, and to automatically command and configure a subset of mobile measurement vehicles and mobile working vehicles at a manufacturing environment to establish the temporary local spatial reference cell and to execute the task while the temporary local spatial reference cell is established. The code can in particular be executed on a local computation unit of the mobile vehicles and/or at a production management or cloud computation unit, preferably wherein at least part of the code is automatically deployed to a specific resource upon demand.

BRIEF DESCRIPTION OF THE DRAWINGS

Devices, methods, systems, setups and computer programs according to the invention are described or explained in more detail below, purely by way of example, with reference to working examples shown schematically in the drawing. Specifically.

The diagrams of the figures should not be considered as being drawn to scale. Where appropriate, the same reference signs are used for the same features or for features with similar functionalities. Different indices to reference signs are used to differentiate between different embodiments of a feature which are exemplary shown. The terms "substantially" is used to express that a feature can, but in general is not required to be realized exactly up to 100%, but only in such a way that a similar or equal technical effect can be achieved. In particular slight deviation, due to technology, manufacturing, constructional considerations, etc. can occur, while still remaining within the meaning of the scope.

DETAILED DESCRIPTION

Figure 1:
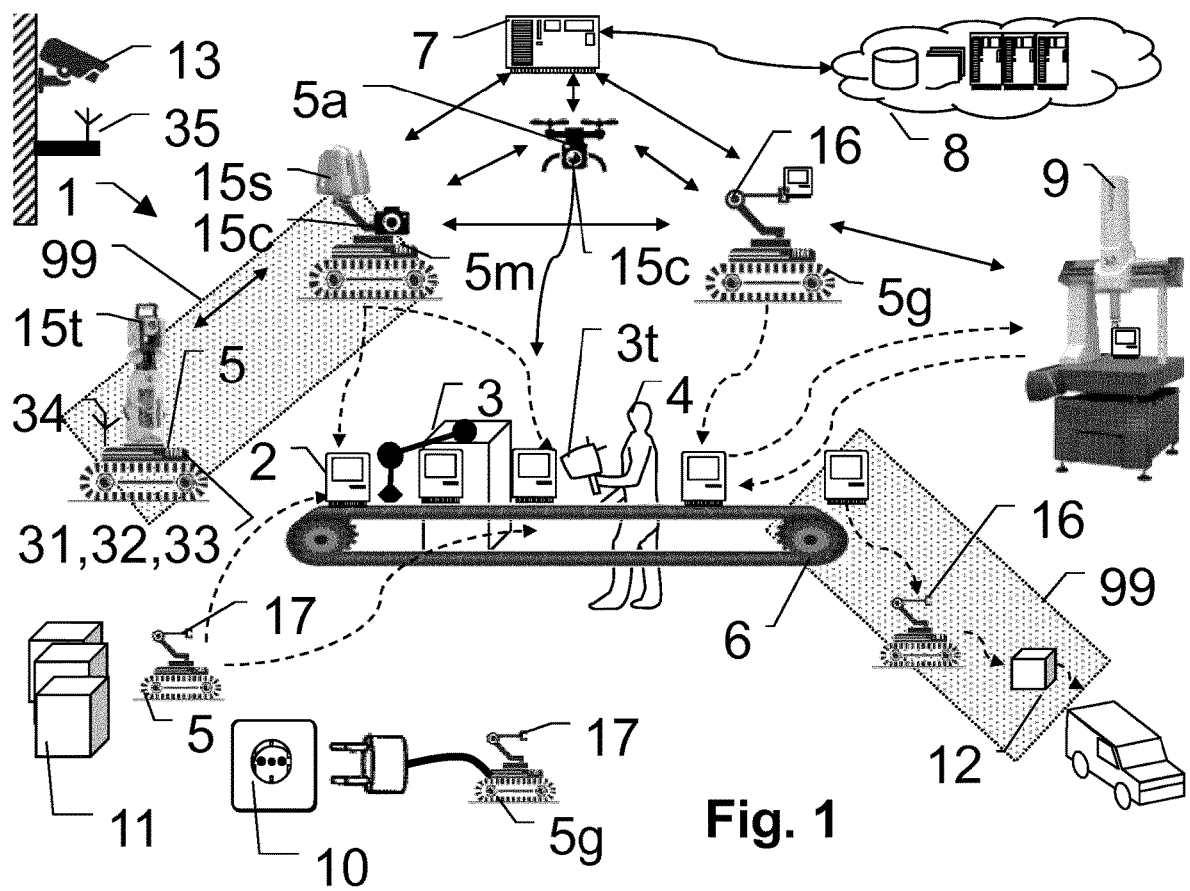
FIG. 1 shows an example of a first embodiment where the present invention is applied in a manufacturing environment with a conveyor belt.

In the example of an embodiment illustrated in FIG. 1, the invention applies to a manufacturing environment 1 with a conveyor belt 6. On the conveyor belt 6, manufactured parts 2 are built and assembled in several steps while they move along, either moving substantially stepwise or substantially continuously. Quality control can be performed dynamically at various stations along that manufacturing process, either in-line or by taking random samples.

The example shows a manufacturing environment 1 where a work piece 2 is manufactured. In this embodiment the factory comprises a conveyor belt 6, along which the work piece 2 is moved in-between different manufacturing processes or steps. For example, the shown work pieces 2 in form of personal computers, but also cars, various electronic and/or mechanical equipment, or parts or subunits thereof etc. can be manufactured in such a dynamic scenario. The produced work piece 2 can therein be a single specific and fixedly defined item, but can in particular also be dynamically changed, varied, adapted or configured to produce different variants of the work pieces 2 or a variety of totally different work pieces ("lot size of one"). Steps of the manufacturing processes can be accomplished by one or more machines 3, by human workers 4, smart handheld tools 3$t$, smart devices like tablet-computers or by a combination of those. The manufacturing environment 1 also comprises multiple mobile vehicles 5, which are preferably configured to move autonomously or freely in the manufacturing environment 1. Such mobile vehicles 5 therefore comprise a propulsion unit 32 or drive unit 32, e.g. with an electric motor, a motor controller and a battery, as well as a spatial locating system 31 for deriving a location of the mobile vehicle 5 in the manufacturing environment 1, e.g. with a Lidar, an (indoor) GNSS sensor, radio navigation, visual navigation, cameras, SLAM, SFM, IMU, guide marks, special sensors, etc., and a navigation and drive unit 32 configured to manoeuvre the vehicle through the manufactory environment 1 in a preferably autonomous manner, e.g. by a computation system on the mobile vehicle 5 which is configured to do so. This deriving of a location of the mobile vehicle 5 in the manufacturing environment 1 for the autonomous navigation can therein be established with a low accuracy, e.g. of some centimetres or decimetres, in particular a relatively low accuracy compared to the accuracy required for a positioning in a manufacturing step of a manufacturing. Therefore, the autonomous navigation for the movement of the mobile vehicle 5 in its environment can rely on different location sensors than the sensors used for the positioning and/or referencing for the execution of a manufacturing task—or if the same sensors are used they can be evaluated by another algorithm and/or with a lower accuracy, which can in general be done faster.

For example, an image from a camera 15$c$ at the mobile vehicle 5$m$ can be evaluated by a less accurate SLAM or collision avoidance algorithm (or unit) during the autonomous navigation when moving around in the manufacturing environment 1, while an image form the same camera 15$c$ can be evaluated by a more accurate reference mark detection and/or surveying algorithms (or units) when the mobile vehicle 5 accurately positions or references itself with respect to a work piece 2 or a machine 3 for the execution of a specific task. An image evaluation by the less accurate SLAM or collision avoidance algorithm can therein comprise a spatial localisation of the mobile vehicle 5$m$ in its environment in an order of magnitude of centimetres or more, in particular with respect to obstacles, e.g. for establishing an autonomous navigation of the mobile vehicle 5$m$ and to avoid collisions. In contrast thereto, an image evaluation by the more accurate reference mark detection and/or surveying algorithm can comprise a spatial registration and/or referencing with increased reliability and precision compared to the SLAM or collision avoidance algorithm, by which an exact spatial reference with respect to the work piece 2 and/or another mobile vehicle 5 or stationary factory equipment 3 is established, e.g. in an order of magnitude of millimetres or below one millimetre. Dependent on an actual operation to be performed by the mobile vehicle 5, the edge computation unit 33 at the vehicle 5 can autonomously select one or both of such evaluations, in particular also based on the same image from the same camera 15$c$. In particular, a certain algorithm for the accurate positioning or referencing with respect to a work piece 2 or a machine 3 can be orchestrated and/or deployed to the mobile vehicle on demand, in conformance with respect to the task to be executed by the mobile vehicle 5. But it can also be embodied the other way round, wherein an edge intelligence system 33 at the mobile vehicle 5$m$ is automatically requesting a suitable algorithm for a spatial referencing with respect to a certain machine 3 or work piece 2, based on the task that the mobile vehicle 5$m$ is confronted with, e.g. in form of a microservice for establishing a docking-manoeuvre. In an embodiment such a deployed microservice can be specifically pre-configured or pre-conditioned—e.g. in the cloud-specifically for those mobile vehicle 5, machine 3 and/or work piece 2 which participate in the specific task. In an artificial intelligence approach, such can e.g. involve a transfer learning approach, in which a deployed microservice for a task comprises a generic machine learned approach for establishing this task which is then specifically supplemented or fine-configured by one or more machine learned specifics for the presently participating mobile vehicle 5,5$g$,5$m$,5$a$, machine 3 and/or work piece 2. For example, by transfer learning, a generalized docking manoeuvre provided by an edge client at the machine to be docked at can be combined to a knowledge at the edge client 33 of the mobile vehicle 5 about its sensors and their capability and specifics in order to automatically derive a most appropriate docking manoeuvre algorithm for this specific instance of docking.

The figure gives an overview of the invention, which leverages an orchestrated combination of smart mobile vehicles 5, at least one of which configured as a smart mobile measurement vehicle 5$m$. The mobile vehicles 5 therein comprise an edge computation unit 33, wherein in view of readability only one exemplary vehicle 5 is representatively shown with a referral number (same as with numbers 31 and 32). Also other equipment in the manufacturing environment 1 can comprise such an edge computation unit 33, like the shown entities 3,3$t$,9,5$a$,5$m$,5$a$,6,13, 35,10, etc. The smart mobile vehicles 5 are configured to be able to communicate with each other and are endowed with an elevated level of autonomy, which is derived from advanced analytical capabilities at the edge and in the cloud 8. The communication can be wired as well as wireless and can comprise a plurality of wireless access points 35, which can optionally also be used to provide spatial references for the autonomous navigation of the vehicles 5. Some exemplary communication links are indicated by arrows. The term edge therein refers to computing infrastructure which exists close to the origin sources of data, in the present case e.g. on the mobile vehicle 5. Such can for example be embodied in form of a distributed IT architecture and infrastructure, in which data processing takes place at the periphery of the network, preferably as close as possible to the originating source. By such an edge computing approach 33, an optimization of the efficiency of a cloud computing system 8 can be implemented, as the data processing occurs at the edge of the network, near the source of the data. Cloud computing 8 therein refers to an approach, where the computing and storage is externalized and/or virtualized over a network link to a data-center, which can also be located remotely from the actual data source, e.g. anywhere in the internet. An edge computing approach can avoid restrictions and potential points of failure, as a dependency on a single core computing system is omitted and also increases scalability and allows alignment of computational power at the actual location where it is needed and avoids excessive real-time data transmission. Not only that time sensitive data can be processed locally at the edge to avoid latencies, also the data volume which has to be transmitted over the network is reduced, as the pre-processing is performed at the edge.

Thereby the cloud servers 8 only have to process and store data which is not highly time critical. For example, the cloud functions can be focused on dashboards function, analytics and ERP systems. In many embodiments, there is a device relationship management (DRM) which manages a plurality of edge devices 33, in particular in form of an enterprise software for monitoring, maintenance, managing and servicing complex, intelligent, and interconnected edge-equipment in a factory network.

Such an edge computation system can also comprise intermediary computer systems 7, e.g. at the edge of a station of a production line, of a production line or of a factory, which processes data in close proximity to the corresponding data source. Such is also referenced as fog computing 7 or IoT gateway 7, providing so to say a kind of a bridge between the edge and the cloud computing 8. But in a consequently implemented edge computing approach, the processing power, intelligence and communication capabilities of an edge appliance or gateway will be shifted more and more directly into the local field devices, like the mobile vehicles 5 discussed in many of the herein described embodiments, respectively to the local automation controller processors and communication interfaces 34 of those mobile vehicles 5.

The mobile platforms or mobile vehicles 5 according to the present invention can also be referred to as collaborative robots or shortly cobots. Mobile vehicles 5*m* according to the invention which are equipped with measurement units for quality control can in particular be referred to as mobile inspection cobots. Mobile vehicles according to the invention which are equipped with sensor units 15, like e.g. laser scanner units 15*s* or laser tracker units 15*t* for accurate spatial measurements can in particular be referred to as mobile reference-cell cobots.

The mobile vehicles 5 can be customizable in their programming to accomplish one or more different tasks in the worksite environment. For example, for different work pieces, different tasks on a work piece 2 or at different locations in the manufacturing environment 1, different configurations or software modules can be flexibly loaded by the mobile vehicle or by its components according to the specific task the vehicle has to fulfil. Such orchestration and assignment of a specific task at a specific time to a specific vehicle can therein be done flexibly according to an availability and the capabilities of the mobile vehicle, wherein much of the therefore required computational intelligence and information can be provided at the edge, which means at the mobile vehicle 5. Upper level tasks can be tasks like supplying parts, machining, mounting, handling, assisting, quality assurance, moving items, moving work pieces, moving workers, painting, gluing, documentation, etc., respectively the according capabilities for fulfilling one of those tasks at the mobile vehicle 5. According to their tasks the mobile vehicles can be equipped with one or more measurement tools 15, actuator tools 16 and/or machining tools 17, either fixedly or in an exchangeable manner. The lower level task can then comprise the detailed information on how to execute the upper level task at a specific work piece for a specific step in the manufacturing and measuring chain, e.g. where, in which order and how:

complementary or additional measurements have to be carried out, tight screws have to be tightened at a work piece, along which path glue has to be applied in which quantity, how and along which geometry to mate which sub-components of the work-piece, etc.

In an embodiment according to the invention, the system can also automatically keep clear a certain working area 99 in the manufacturing environment which area is required for the current task. For example, if there are obstructions or obstacles in form of persons 4, particularly staff, these persons can be sent a notification to leave the working area. If the obstructions are equipment 3*t* or other objects assigned to a particular person 4, this person can be sent a notification to remove the objects from the area. The notification can be sent to a mobile device assigned to the person, e.g. a smartphone or other personal device—for example an augmented reality, virtual reality or mixed reality view can be provided to the person 4, in which areas to keep clear are visually marked and an acoustic and/or haptic warning can be issued if such an area is approached or entered. If there is an obstruction in form of a mobile vehicle 5, this mobile vehicle 5 can be provided with an instruction to move out of the working area. The system can e.g. dynamically define a virtually keep-out zone 99 in the manufacturing environment, in particular specific for the current task to be established and/or temporarily for the duration of the current task.

The mobile device also can be a device especially designed for use with the workflow deployment system and for the purpose of receiving these notifications. It can be equipped with a spatial localisation system and can transmit its position to the smart manufacturing system. The notification may further comprise information about extent of the measurement area that is to be kept clear and information about an expected duration of the measurement. The notification can be transmitted directly in-between the involved devices and vehicles 5 and/or to a factory management system 7 which generates and provides a virtual fence around the working area and automatically deploys this fence to the relevant participants. In an embodiment the system can also comprise a geo-fencing agent at the edge computation units 33 which is configured to keep track of such keep-out zones 99 in the manufacturing environment and to interact with an autonomous navigation unit to avoid a violation of those zones 99. In particular, a notification about a keep-out zone 99 can be broadcasted locally in a small range around each of the keep-out zone 99 and the autonomous navigation unit of the mobile vehicles can be configured to handle those zones 99 as virtual obstacles.

Besides strict manufacturing tasks, there are also peripheral tasks which can be established by the mobile vehicles 5, like e.g. stock 11 handling, managing and organizing stock supply, distributing stock supply, quality checks, taking random samples, bringing random samples back into the manufacturing process, processing random samples at remote test facilities 9, end control, packaging 12, loading, shipping, delivery 12, etc.—either locally at the manufacturing environment 1 or at/to remote locations. Other peripheral tasks are also the maintenance of tools 17 and of the mobile vehicles 5, charging 10 of the mobile vehicles 5, etc.

An electronic controller at the mobile vehicle 5, e.g. comprising a computation unit and a communication interface 34 is therein configured to establish a bidirectional data link (indicated by double arrows) to the factory environment, in particular to other mobile vehicles 5, to stationary manufacturing equipment 3 or 9, to a stationary network access point 7 and/or to a higher-level manufacturing control and management system 7 and/or to a cloud computing environment 8. Such higher-level systems can e.g. be configured for overall orchestration, optimization, path planning, global resource allocation, etc. According to the invention the electronic controller is embodied as a so-called edge-device 33, which brings computation power and intelligence to the source of the data, whereby the factory system is decentralized. One example of such step in the direction of decentralisation can e.g. be an autonomous movement of the vehicle 5, which can involve providing the vehicle 5 with a desired destination to move to, but not necessarily with details of a defined path to follow. The path and the navigation along the path can be determined autonomously by the edge-intelligence of the controller 33 at the mobile vehicle 5. Doing so can be assisted by various meta-data information, e.g. a desired destination time, a priority level, etc. According to the present invention, the mobile vehicle 5 can be configured to be aware of many of such meta-information on its own. For example, the mobile vehicle 5 can be "aware"—which means comprise and/or access information—of its technical capabilities, its equipment, its location, its actual state, its payload, its actual and/or further task, its service intervals, but also of boundary conditions in its surroundings (e.g. conflicting trajectories, steep paths or stairs, and the like) etc. The mobile vehicles 5 can be configured to prepare, compute and provide such information at the edge, which means locally at the vehicle respectively at the technical subsystems or units at the mobile vehicle 5. This edge information will then be utilized by other mobile vehicles 5, machinery 3 and/or the control system 7, wherein the mobile vehicles 5 are configured to have autonomy.

Besides the autonomous ground vehicles (AGV) 5g, also airborne mobile vehicles 5a like unmanned aerial vehicles (UAV) 5a or drones can be comprised in a system according to the invention. For example, such UAVs 5a can be flying around the factory and making quick checks with limited sensors and sending a more specialised mobile vehicle 5g or cobot, if some potential problem is detected. UAVs 5a can also be used to quickly supply smaller amounts of parts which are running out, replacement parts for tools, production equipment or manufacturing parts, etc.

In an example of an embodiment, there can be a communication between an UAV 5a and an UGV 5f. In a special embodiment, the UAV 5a can also be combined with the UGV 5g, using the UGV 5g as a mobile base for the UAV 5a, which can e.g. also provide resources for re-charging 10, exchangeable equipment, a spatial reference, etc. In an example of a scenario according to the invention, the UAV 5a can be sent to a specific location by the UGV 5g for conducting a first rough defect inspection by sensors mounted on the UAV 5a, e.g. by a camera 15c. Based on the outcome of a defect analysis based on the images of the UAV-sensor data, e.g. by image processing and identification applied to images from the camera 15c, potential problems can be identified, for example, by using machine learning and advanced analytics. Then, another UAV 15a, UGV 5 or a human supervisor 4, which is equipped with more appropriate sensors and/or actuators can be automatically ordered to be deployed for a more accurate and detailed evaluation or for a corrective action.

A vital aspect in many of such tasks and in the present invention is to establish a spatial reference of the participants which are involved in this task, like one or more work pieces 2, one or more work tools 3,3t,9,17, a conveyor belt 6, a parts supply unit 11, etc. In embodiments according to the invention, some manufacturing step, which is not strictly bound to a specific time and/or to an exact order into the manufacturing process can also be established by such a mobile vehicle 5 not at a single specific location at the conveyor belt 6 or manufacturing environment 1, but by one or multiple mobile measurement vehicles 5m at some arbitrary location which can be inferred on demand using machine learning, based on availability of resources, capacity and/or space. Such can not only comprise a global surveillance 13 of the manufacturing environment 1 or of portions of it, but it can also comprise a local surveillance of spatial references which are specific to a certain work piece 2 and/or low-level task. For example, such surveillance can be established by fixed sensors 13 for monitoring, surveillance, object tracking, etc., in particular with cameras 13 and machine learned image recognition, detection, classification or the like.

The present invention is not only relating to work piece 2 fabrication steps, but also to quality assurance, monitoring and controlling steps. By the freely movable mobile measurement vehicles 5m according to the invention, such quality assurance steps can be established substantially anywhere along the conveyor belt or production line 6, in flexible manner and on actual demand. For example, a quality checking mobile vehicle 5m can be ordered by another static or mobile production entity 5g,3,3t in the manufacturing process, in particular in case of an error, problem or ambiguity that perchance arises during the production. This quality checking vehicle 5m can e.g. be equipped with cameras 15c and sensors specifically designed for one or more of such quality checks. In an embodiment there can be some generalized quality checking vehicles 5,5a which are configured to do many checks, but not all of them with a precision and reliability that is high enough to clearly identify each and every problem, while there can also be some highly specialized quality checking vehicles 5,5m which are not as general but highly accurate in a specific discipline. For example, a generalized mobile vehicle can comprise cameras 15c and/or a laser scanner 15s, whereas a specialized mobile vehicle can e.g. comprise a movable CMM machine 9, an articulated arm or a total station. As those vehicles are mobile, a quality check can be done at various stages of the manufacturing process, whereby a smart factory environment can be established which e.g. also brings the advantage that not all of the manufacturing stages, production equipment and mobile vehicles 5 have to be per se or precautionary be equipped with lots of sensors, quality check equipment, measurement tools—together with all the according edge computational intelligence 33 and access to the therefore relevant production data—all of which requires maintenance, updates, etc. According to the invention, a mobile vehicle 5 for quality insurance can be ordered in case of a problem to any location at the worksite environment 1, in particular in case of an unknown problem with an automatic delegation in which first a generalized vehicle (like a camera 15c inspection UAV 5a) is deployed with the task of identifying the problem, which generalized vehicle can then automatically delegate or re-assign the task (or a task that is further specified according to the findings of the generalized vehicle, or a sub-part of the task) to specialized mobile vehicle 5m,5g for identifying details and/or for resolving the issue. According to the invention, at least part of the involved computing is therein established at the edge computation unit 33, which means at the mobile vehicle 5.

For quality inspection there can be an analysis of deviations "as planned" vs. "as built" and thereof actions can automatically be triggered by the computation units at the smart factory environment. On a measurement and/or analysis side, such an action can comprise for example a collection of more real-world data by a measurement functionality of one of the mobile vehicles 5, by which e.g. a refinement of the analysis can be established. On a manufacturing side, such action can comprise for example an adjustment of production parameters, like slowing down the machines 3 to decrease failure rate, exchange of worn tools, re-adjustments of the machine 3, adaption of the manufacturing equipment 3,3t,17, etc. In unclear situations, the action can also comprise the involvement of a human 4, e.g. providing the acquired data to a human who takes a final decision, sending out a service engineer to the on-site location, etc. By the presently promoted dynamically re-configurable edge client architecture, in particular combined with a data integration software such as EdgeFrontier of Intergraph, not only a high-level, dashboard-type data can be provided for such human analytics, but in case of necessity, also in-depth, low-level analysis data from the factory floor can be derived, preferably substantially in real time. For example, by such an on-demand deployment of according agent modules, services and/or micro services to the edge computing units 33 in the field, in depth insight is given when needed but computation effort and data-volume is not bloated during regular operation.

Such an involvement of a human 4 can e.g. also comprise a deep reinforcement learning from human preferences, in order to refine the automated decision evaluation by the computation entities in the smart factory network. Such human decisions can also be used as role models to be applied to other instances of similar problems by transfer learning.

The system according to the invention is configured to re-arrange itself to the dynamically changing needs. For example, comprising an automatic selecting of the best sensor-AGV 5 for the task of evaluating a set of pre-defined key performance indicators like minimize cost (operations, manufacturing, maintenance, . . . ,
  fulfil minimal measurement accuracy requirements,
  achieve maximum throughput of the production,
  minimize tool wear,
  equal distribution of jobs across the whole set of available measurement units,
  etc.

The present invention can in particular be embodied in the context of cyber-physical systems, smart factories, or Industry 4.0, which are aiming at fostering the computerization of manufacturing, in particular comprising systems with multiple intelligent entities at workshop level which are configured to communicate and cooperate with each other and with human workers 4, e.g. over the Internet of Things.

The present invention can therein in particular comprise an integration and communication over the Internet of Things, like sending data from mobile platforms like the mobile vehicles 5 to a command centre 7 or 8 for cloud analytics. Based on the resources needed, computationally expensive tasks can thereby be carried out in the cloud 8, which can have availability of larger memory, CPU & GPU clusters, etc. which is not locally available at the edge on the mobile platforms, while other analytics tasks with lower computational effort and/or real time requirements could still be performed at the edge. The invention can also comprise sending workflows from cloud and in-between mobile platforms. Workflows can be sent from the command centre to any mobile platform in the fleet. By utilizing their self-defining properties, multiple of the mobile platforms can also communicate directly with each other, without making a detour over the command centre 7 or cloud analytics 8. For example, the mobile vehicles can establish a direct and fast engagement when needed by directly sending workflows to each other. Appropriate workflows can be programmed, reached or derived from the output of machine learning and advanced analytics algorithms, at the edge 33 and/or in the cloud 8.

As an example, an increase in the production volume or throughput will cause the system to decrease the number/ quality of quality control while still matching the minimum quality control. But a decrease in the production throughput can optionally trigger an enhanced (time-consuming) quality control and maintenance routines to be scheduled or done earlier than necessary. A decrease in production throughput can for example also trigger extensive data collection for machine learning purposes by utilizing the surplus available capacity, time and resources.

Figure 2:
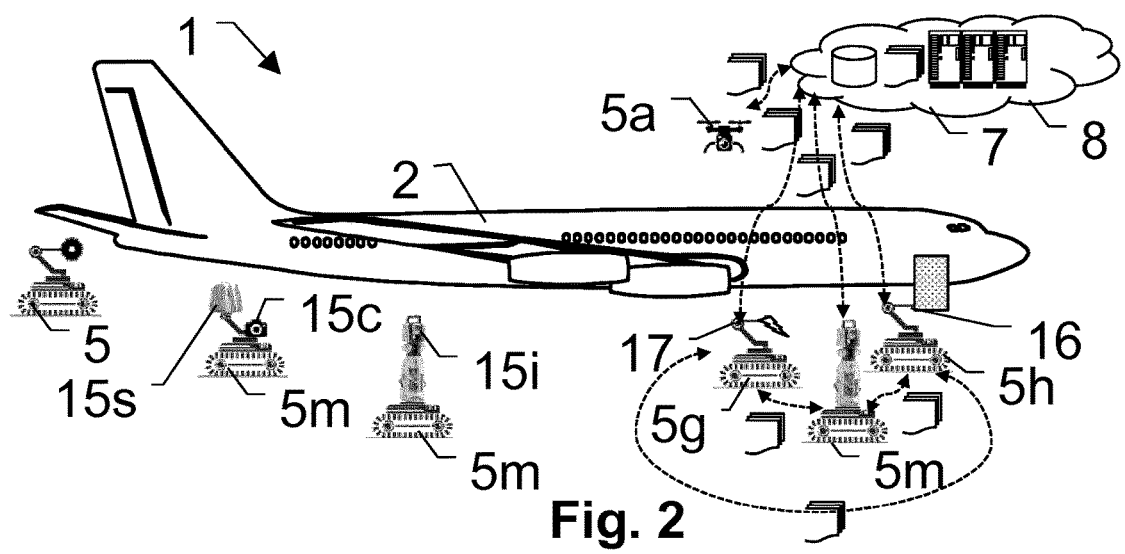
FIG. 2 shows an example of a second embodiment where the present invention is applied in a stationary manufacturing environment.

FIG. 2 illustrates another embodiment according to the invention. It shows an example of a static part scenario, in which larger work pieces 2 are manufactured, e.g. airplane cabins or wings, which are typically not moved around in-between each manufacturing step but are substantially static in their location. Diverse measurement or machining actions are then undertaken by workers and/or robots that move to and around the static work piece 2.

In the shown embodiment of a factory environment 1, the work piece 2 or part which is manufactured is not moved around in-between each manufacturing step on a conveyor belt 6, but is held substantially static and the parts, structural elements, machinery and equipment for manufacturing the work piece 2 are moved to this static location of the work piece 2. For example, in the shown embodiment of the invention the shown aircraft 2, but also ships, cars, trucks, buildings, large furniture, etc. can be manufactured in such a static-part scenario or in a scenario where the part or work piece 2 is substantially static for a large number of subsequent manufacturing steps. The term substantially can herein for example mean that the work piece 2 is static before the part is eventually moved to another location for another sequence of steps, which can e.g. require a different environment, like a static assembly location, then moved to a static painting location and then moved to a static quality check location including turbine-test, and function test, etc.

Therein, the mobile vehicles 5—which can be embodied equal or analogous to the herein elsewhere mentioned characteristics—are therein establishing and/or aiding the manufacturing and/or quality assurance process in a highly automated manufacturing environment 1. The mobile vehicles 5 are here only shown outside of the airplane 2 but can also act inside of it. There can also be a collaborating subset of mobile vehicles 5 whereof part is outside and part is inside, e.g. with a mobile vehicle 5m carrying a surveying instrument 15i and a supply bot mobile vehicle 5h and a riveting mobile vehicle 5g on the outside and a here not visible additional laser tracker mobile vehicle 5m and mobile working vehicle 5 inside of the work piece 2, which are automatically deployed for the task of fitting a window, and which are collaborating in a common temporary local spatial reference cell established for this task and involving outside as well as inside mobile vehicles, spatially referenced with respect to each other by the two mobile measurement vehicles 5m establishing a virtual spatial inside-outside link.

Also shown is an airborne mobile measurement vehicle 5a, which is flying around the work piece 2 and taking random measurement samples and images to be automatically analysed by computer vision algorithms for potential faults or inaccuracies. In another embodiment the quality control can make progress from random sample approach as known to a more intelligent approach, which comprises an algorithm for determining locations and/or times for taking the samples. Thereby the samples can be deliberately chosen by a machine learned system instead of being randomly sampled. Such an algorithm can therein at least partially comprise an artificial intelligence system, for example a system that can be trained and/or learn during the production process modalities for taking quality control samples. Instead of random samples it can e.g. specifically choose samples selected from insights/effort considerations, i.e. samples that are taken from most appropriate locations generating the most insights and/or at intervals that give a good temporal understanding of what's going on in the manufacturing. For example, if one processing station initiates a tool-exchange (e.g. replacing a worn driller), the system according to the invention can automatically command a measuring AGV 5a to this processing station, e.g. to exactly measure the new driller and/or to measure the first part produced with the new driller in order to verify that everything is all right. Therein, edge intelligence systems at the processing station and/or at the AGV 5a can establish such a functionality substantially autonomously. For example, the edge intelligence at the processing station can broadcast an order for any measurement unit capable for a quality control of the feature X at part Y which is established by the station, e.g. for the first time and/or for the first time with a new tool, in particular also in timely manner in advance of the first time. Edge computation at the mobile measurement AGVs 5a can then autonomously determine their eligibility, negotiate their availability and proximity, if necessary request further detail information from the processing station and/or from a primary control unit about the part Y, the feature X, the processing station, etc.

In another embodiment, an edge computation system at a subsequent thread machining station records an increase in the required torque and computes (e.g. by a transfer learning from other stations) that such is likely caused by an inaccurate hole diameter as it mostly results from a worn driller. Based on machine learning from historical data it can also be computed that such would impact the service life of the tapper. This insight can then be communicated to a cloud or fog level computation system, which is in knowledge which processing station drilled the hole, if there is sufficient stock of tappers and/or drillers, etc. and thereof automatically classifies and rates a measure to be taken from a perspective of an overall manufacturing perspective. This action is then ordered, e.g. by deploying orders to a supply-bot to fetch a new driller and a mobile measurement bot to investigate on said hole at the output the drilling station and to assure and document a quality improvement after the drilling station was ordered to exchange the driller. It can also order the edge system at the thread machining station to report on improvements of the torque value and to report an updated estimation of the expected lifetime of the tapper, e.g. for further long-time planning or to start investigations about other minor likely causes of the increase of torque. Thereby, a taking of a sample for quality control at a first location is initiated by an edge computing system at a second location, wherein the sample is analyzed by an autonomous mobile vehicle, preferably in-line with the production process.

In an advanced embodiment, the edge computation systems are not all pre-configured with all of the algorithms described above, but the system comprises software components, e.g. in form of micro-services, software modules, container applications, etc. which are deployed or provided upon demand by an orchestration system. The orchestration can therein comprise a deploying of code to be run at the edge and/or starting and providing a running version of the code at a cloud or fog level which will be used by the edge system, latter in particular for more computation intense and/or less real time critical calculations.

If the automatic analysis identifies potential problems, a manufacturing control system to which those results are provided, can automatically deploy more specific mobile vehicles 5 for analysing and/or mending the potential problem.

In a particular embodiment of the present invention, which is exemplary discussed in more details below, e.g. a mobile laser scanner 15s can be supported with a mobile laser tracker 15i to provide a dynamic reference cell or reference frame for a measurement and or for a production task to be established at one or more work pieces 2. By the present invention there can also be an implementation of multi-stage inspection or quality control, e.g. with automatically selecting per inspection task the most appropriate vehicle (UGV and/or UAV equipped with different/multiple sensors) and/or automatically deploying more or different mobile vehicles with other/additional sensors when needed and/or automatically calling a service engineer.

An embodiment of the invention can also comprise a learning from and teaching to human workers by the mobile vehicles. Such can involve a learning of workflows from human workers, either by manual or virtual guidance of the mobile vehicle by a worker, showing how to do a task to the mobile vehicle, adapting, interactively correcting and optimizing an execution of a task established by the mobile vehicles, conducting an automatically derived arrangement of the mobile vehicles for executing the task, providing or proposing options and alternatives for an execution of a task (e.g. substitutes for the case of unavailability of a resource), sharing knowledge with other equipment and mobile vehicles in the fleet by making learned information globally available to other mobile vehicles and/or the upper level management and orchestration system.

Such can also comprise implementing a feedback loop which is involving human operators and one or more mobile vehicles. For example, a decision of the autonomous system can be interactively validated and approved, amended or rejected, by a human operator. In particular, such a feedback loop can be configured in a way to provide room for improvement through relearning, reinforcement learning, transduction, etc. The other way round, a mobile vehicle according to the invention can also be configured for teaching workflows to human workers, e.g. by providing visual and/or acoustic guidance, Augmented/Virtual/Mixed Reality (AR/VR/MR) views of the task, etc. Also an aiding of the workflow by the mobile vehicle, e.g. by providing and/or automatically managing checklists, pre configuring tools, fetching and carrying items, acting as assistant, etc.

An aspect of the present invention can also be an automatic optimization of the manufacturing process, which can be established based on optimally prioritizing and assigning tasks to different working entities (robots, humans and/or mobile vehicles) at the command centre level 7 or cloud level 8, based on demand, resources and their locations, availability and capabilities, and the thereto related digital awareness of those aspects in a system according to the invention, preferably an awareness at edge level of the mobile vehicles 5. Such can in particular involve an autonomous analysis and identification of failure patterns, re-scheduling of tasks, an estimation of effects on production time and strategies to avoid production bottlenecks and for compensating outages. For example, in case of failure at a processing station along a production chain, a system according to the invention can automatically harvest a collection and arrangement of mobile vehicles 5, which provide required capabilities and/or human workers in order to temporarily substitute the processing station, so that a complete production halt can be avoided. Such can also comprise establishing multiple instances of such temporary substitutes working in parallel to achieve a required productivity level equal to the out of order processing station. Such a substitution can also comprise an automatic configuration or re-configuration of the mobile vehicles 5 with the required equipment and tools available and most suitable to fulfil their task, in particular in view of the self- and context-awareness of the edge clients at the mobile vehicles. In another embodiment, there can even be hardly any fixed processing stations, and most of the work is established by continuously and automatically re-arranging groups and sets of the mobile vehicles 5 on demand, depending on the present work load and task list and production planning from an upper level global planning and strategic computation instance.

As an aspect of the present invention, there can also be an autonomous dispatching of the mobile vehicles 5 or platforms, involving path planning of their movements, e.g. leveraging factory map, defined waypoints, etc. There can also be a collision avoidance at both the command centre 7 as well as at the edge level at the mobile vehicles 5, e.g. with a leveraging of knowledge of a factory map and location of other objects and mobile vehicles at the command centre 7 level combined with an edge-navigation locally at the mobile vehicles 5, using range sensors, cameras 15c, direct communication with other mobile vehicles 5 or static equipment along their traveling path to optimize the path and/or avoid collision.

Some examples of bidirectional information exchange via the communication interfaces in-between the mobile vehicles and/or in-between the cloud resources are also illustrated in this figure, and could e.g. comprise work piece information, workflow information and/or tasks, management information, resource allocations, software deployments, microservice deployment, AI-deployment and in particular transfer learning deployment, big data information, etc.

Figure 3A:
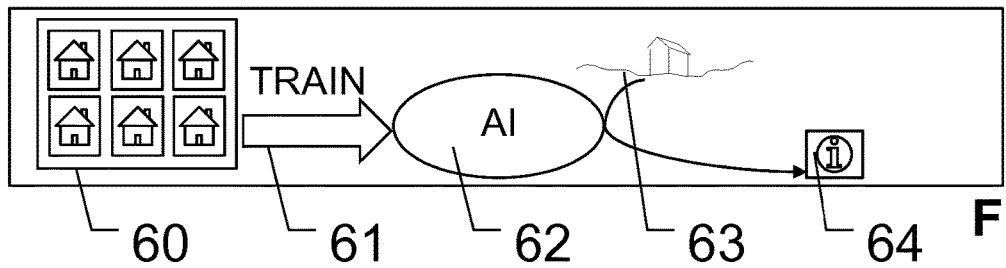
FIG. 3a and FIG. 3b are illustrating an example of a transfer learning approach.

In FIG. 3a, a training dataset 60 is used for a training 61 of the artificial intelligence system AI 62, which is then applied to verification data 63 to derive an evaluation of the functionality of the AI 62. Once successfully tested, the AI 62 is then applied to real world data replacing 63 and using its results in the present invention instead of the verification 64. The shown example of an image of a house was herein chosen in view a simple illustration, apparently the industrial processes in the present invention will utilize different data (also not limited to images) like work-pieces, components, tools, machinery, good parts/bad parts, various measurement values, etc.

Figure 3B:
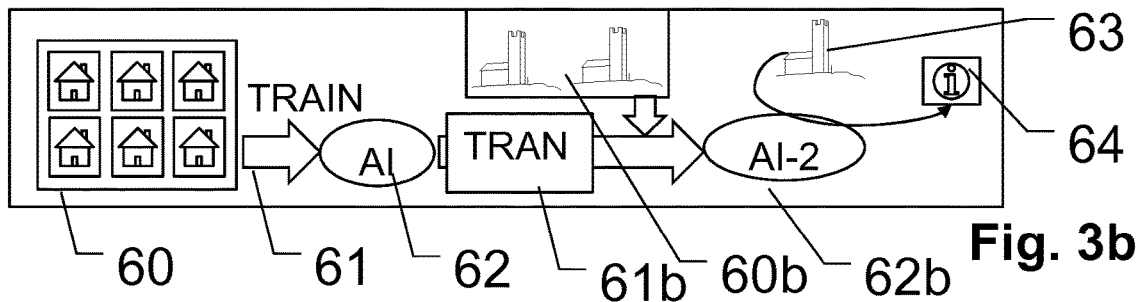

In FIG. 3b a transfer learning of the resulting AI system 62 is applied. The AI 62 is therein provided to a transfer learning approach 61b, which is in this case supplemented with additional training data 60b of a different type, but similar nature, in this case a factory instead of an ordinary house. By the transfer learning approach 61b in most cases, the required amount of training data 60b can be significantly reduced, as the resulting artificial intelligence system AI-2 62b can rely on many of the similarities already comprised in the transferred AI 62. Again there is then the verification and application as discussed above, respectively a re-training, supplementary training or parameter adaption, if the verification fails.

In an embodiment of the present invention in which transfer learning is utilized, such can e.g. comprise a transfer learning between the edge computation systems at the mobile platforms, but also in combination with higher level computation systems. For instance, a measurement unit is configured for quality inspection and its task is to detect and classify various defect types. The unit somehow detects an anomaly, e.g. a deviation from previously built and inspected items, or a deviation in between "as measured" and "as designed" e.g. leveraging construction and design data from a 3D model, but cannot match it to any of the defect types it knows, e.g. it cannot classify the anomaly with reasonable confidence into one of the previously machine learned classes which are available to this measurement unit. For example, a local spatial reference cell can somehow not be established as supposed in view of the corresponding virtual model, e.g. as there are ambiguities or contradictions in the measurement data. In such a scenario, the edge-analytics unit at the unit can query information from other entities, (like all other mobile platforms with a similar measurement unit or task, or the archived data lake in the cloud, etc.) whether those have encountered a similar "sample" with such an anomaly before and/or if those have already learned a classification for it. As another option it can also provide its sample to a highly specialized cloud machine learning unit which can process the sample with more advanced and resource intense ML-algorithms like deep learning approaches. The learned knowledge from such another entity can then be shared and the local model at the edge-computation system of the measurement unit can then be updated based on this information. Even new, previously untrained classes of anomalies can automatically be detected, clustered and classified by such a system, e.g. if several platforms individually detect previously unseen defect types, they can cross-check whether those detected defects comprise significant similarities. Such unseen defect types can optionally also be reported to an operator via a dashboard analytics system to request human feedback to verify this and may be provide a new classification and/or corresponding measures to be taken.

The transfer learning approach from above can not only be applied at an edge analytic engine of a single unit, class of vehicles or factory, but also across different factories and/or locations, e.g. through a cloud instance. The transfer learning is also not limited to a single specific product, but can be applied across different types of manufactured products. For instance, a robust quality inspection model A can be learned for product A. For the manufacturing of new product B, the same model A can be re-trained and/or fine-tuned on fewer examples than needed when starting from scratch for a model B. This not only results in accelerating deployment on the production line, but provides a more efficient usage of resources and digital storage.

As an example for another application of transfer learning in an application different from quality inspection, a collision avoidance system of the autonomous navigation systems of the mobile platforms can benefit from transfer learning of the experiences of any other member of the fleet. For instance, one platform encounters a previously unseen type of obstacle, and possibly bumps into it—the autonomous navigation unit is trained to avoid such in the futures, e.g. by a reinforcement learning. The representation of this obstacle (e.g. visual, depth etc.) and the result of the reinforcement learning not to bump into it, can then not only be used locally by this specific platform, but can be used to update a generalized "obstacle model" using transfer learning, which can then be shared with other platforms, e.g. also with different platforms like UAVs, etc.

Figure 4A:
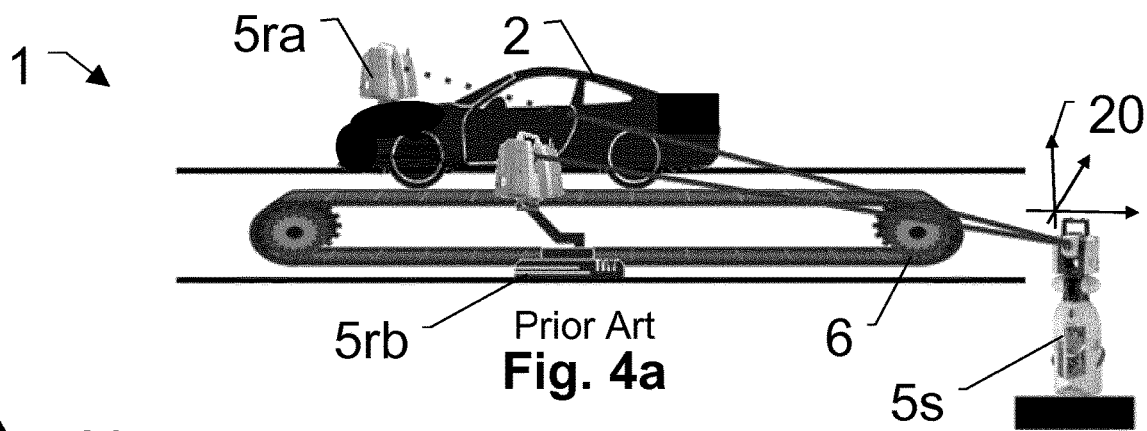
FIG. 4a shows a first detailed view of an example of an embodiment of the present invention.
Figure 4B:
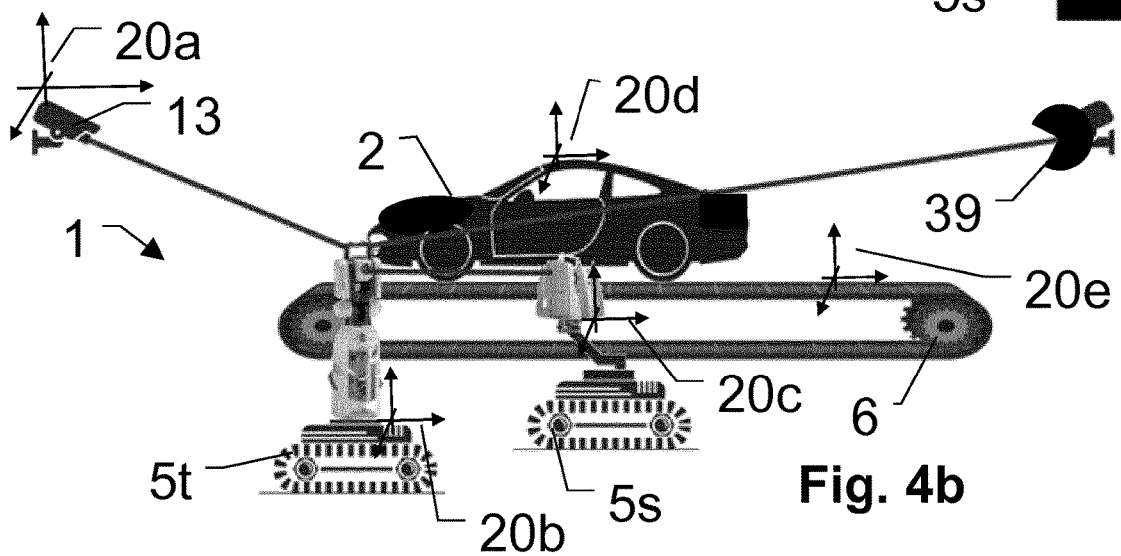
FIG. 4b shows a second detailed view of an example of an embodiment of the present invention.

FIG. 4a and FIG. 4b illustrate exemplary embodiments of prior art versus the present invention, in which a manufacturing of a car 2 is symbolized. The car as work piece 2 is moved around in the manufacturing environment 1 in-between different manufacturing stages. For example, such moving around can be established by a kind of defined path along a conveyor belt 6 or rails. In another embodiment, the work pieces can also be moved by a mobile platform, which can move rather freely in the manufacturing environment 1, e.g. as the work piece 2 is directly applied to an autonomous mobile vehicle or just being moved by a mobile vehicle 5 which is detachable and attachable to the work piece 2 or to a work piece carrier or the like. The figure symbolizes such by the shown conveyor belt 6. According to the invention, there are multiple mobile vehicles 5 at the manufacturing environment 5, which are involved in the manufacturing of the work piece 2.

The prior art system of FIG. 4a shows a stationary, fixedly mounted measuring device 5s in form of a laser tracker that is specifically provided to reference two laser scanners 5ra and 5rb which are movable on fixed rail system and which can be mechanically locked to the conveyor belt 6 to follow the work piece 2 along its way, in order to do a quality control scan of the work piece 2. The spatial reference 20 is thereby fixed to the factory floor. In case of a problem, e.g. by which the scanning routine by the device 5ra is taking more time than expected, this prior art system has to stop the conveyor belt 6, as otherwise the illustrated obstruction of the line of sight in-between the stationary laser tracker 5s and the dragged along laser scanner 5ra would occur—which is not permissible. The shown setup also suffers from the problem that two laser scanner devices are required, as a single one would not be capable of covering all required sections of the work piece 2.

In FIG. 4b according to the invention, the shown mobile measuring vehicle 5t configured with a laser tracker that is configured to temporary provide a spatial reference frame locally at the work piece 2 on a conveyor belt 6. This reference frame is also established for a quality control task that is established by a mobile vehicle 5s configured with a laser scanner and which has to be spatially coordinated with high accuracy. Such a coordination is established according to the invention by the temporary spatial reference cell that is set up for this specific execution of the task. An advantage of the present invention is the fact that the mobile vehicles can move, wherefore e.g. the before shown obstruction of the line of sight to the laser scanner 5ra can be avoided. Also a flexibility of usage and adaption of the involved entities 5t and 5s to other tasks can easily be established. For example, in case that the laser scanner 5s fails, the system can automatically adapt itself to complete the task by automatically ordering a replacement mobile measurement vehicle 5s with a laser scanner, which can autonomously navigate itself through the manufacturing environment to the work piece 2. For the work pieces 2 which cannot be scanned meanwhile, the intelligent manufacturing system automatically configures the system to make up for the missing scanner at a later stage in the production line.

In other words, at least one of the mobile vehicles 5 is configured with a spatial measurement unit as a mobile measurement vehicle 5m. By this referencing mobile measurement vehicle 5m, a local reference cell 20 can be established, when a spatial reference is required for some task to be executed at the work piece 2. According to the present invention, this reference cell 20 does therein neither need to be a global one nor to be durable, but can be local and temporary only. In particular, this reference cell is established specifically for a certain task to be established, which means that it can only provide a spatial reference of the spatial information which is actually required to fulfil the task (e.g. with a certain, task-related spatial origin or relative reference and/or with a certain task related spatial accuracy) and it has only to be established and/or maintained for the duration of the specific task and can thereafter be abrogated and e.g. be taken over by another reference cell for the next task. In other words, the reference cell is dynamically established, dismissed or adapted on demand, in particular automatically in dependence of an actual task to be executed at the work piece. Such an automatic setup, dismissal or adaption of a local temporary reference cell can according to the invention automatically be derived from the awareness at the control logic of the mobile vehicles 5 of their own capabilities and external requirements in view of the actual situation and state of the manufacturing process and of the global planning strategies. By configuring the manufacturing system with such autonomy and capacities of self-organization, a flexibility of the overall manufacturing process can be improved and the manufacturing system can react on specific—also unplanned—situations by substantially reorganizing itself autonomously.

For example—in a joint view with the later following FIG. 5b and the additional mobile vehicles shown therein—at a station of the conveyor belt 6, there is the task to glue some access cover to a car body 2 at the conveyor belt 6. Such requires a mobile vehicle 5g configured with the capability of applying glue and a mobile vehicle 5b for providing and attaching the access cover to the work piece 2. The required spatial accuracy of the glue application is therein relatively low e.g. in an order of magnitude of about 2 to 3 mm, whereas the application of the access cover has to be established with a much higher accuracy, e.g. in an order of magnitude below 1 mm. In an embodiment according to the invention, the automation system of the factory orders a mobile vehicle 5g with the required capability of gluing from a pool of available vehicles at the manufacturing environment, and provides it with information of the task, whereby the mobile vehicle 5g can confirm its capability to execute the task and also its availability for this task in view of other gluing tasks in the manufacturing environment. The automation system of the factory orders a mobile vehicle 5b with the required capability of applying the access cover by its handling unit and a mobile vehicle 5s as supply bot for catering the access cover. In prior manufacturing systems, there would have been a dedicated unit for both tasks of glue applying, picking and placing the cover, as well comprising all the necessary sensors for doing so. According to the present invention, one mobile measurement vehicle 5m is ordered, which provides the capability of spatial measurements, for example a mobile vehicle comprising a laser tracker, a laser scanner, a laser distance meter, a tachymeter, a total station, etc. Thereby, flexibility of the manufacturing can be increased without impairing productivity.

All the mentioned vehicles 5m, 5g, 5b which are ordered, move to the location at the conveyor belt 6 and there a local reference cell 20b is temporary established, preferably only in-between the task-relevant components and equipment. For example, the ordered mobile measurement vehicle 5m can be equipped with a laser tracker and automatically being configured to automatically establish a spatial reference cell 20b in-between the mobile vehicle 5b for applying the access cover and the mobile vehicle 5g for applying the glue. This task and details on how to execute it can be automatically derived from an upper level management system, but also refer back to previously taught or learned specifications for this task and/or for the mobile vehicles 5, as those are self-aware of their capabilities. Such can e.g. involve automatic deployment of task-related software—in particular in different layers of abstraction, e.g. from a rough high level command "apply access cover A to work piece B" at management level in the cloud, down to an actual movement program and dispensing scheme for the motors at a glue application head at the mobile vehicle 5g—which also depends on the local spatial reference cell with respect to the access cover at the time of application, etc. By the edge computing approach according to the present invention, the top level cloud system therein does not bother with software code for the low level motor movement, which is done locally at the edge by the edge device automatically accessing the required details of the construction plan-information which is corresponding to the task information. Therein, due to the low accuracy requirement of the glue application the reference is confirmed to be established, when this required accuracy is ascertained, whereupon the task of applying glue onto the access cover can start. In some embodiments this can be done while the involved mobile vehicles 5g, 5b, 5m are not moving and the reference cell 20b is stationary and static, in other embodiments, this can even be done while at least one of the involved mobile vehicles 5t, 5s is moving and the reference cell 20b is dynamically adapted and/or moving. The spatial reference is therein maintained as long as this task last and can thereafter be dismissed.

When the glue has been applied, the mobile measurement vehicle 5m with the laser tracker is temporarily establishing another more accurate spatial reference cell, this time involving at least the work piece 2—which means the car body at the conveyor belt 6—and the mobile vehicle 5b for applying the access cover, respectively the access cover itself or some kind of application arm which configured to apply the access cover to the car. This more accurate spatial reference cell is established with a higher precision, as the task of applying the access cover requires more accuracy than the application of the glue before. Therefore, the spatial referencing can take more time and/or can require the work piece and the mobile vehicle 5b for application to be (at least temporary) stationary and/or moving with the conveyor belt 6 for the time of application. The automated manufacturing system can therein derive those requirements for accuracy from the task ordered by a factory management system 7 and by the mobile vehicles providing their configurations and capabilities. In the present example, the system could also have automatically chosen to utilize different spatial referencing systems for establishing the two temporary spatial reference cells 20d, 20e, since their accuracy differs, wherefore e.g. the lower accuracy spatial referencing could also have been established by a less accurate laser scanner or the like. Yet the above presented solution was automatically chosen by the manufacturing system in view of a query of the edge computing systems of the mobile vehicles 5 for their availability together with the fact that a usage of the more accurate referencing, which would technically not be necessary for the gluing task, but in view of resource availability, resource usage and resource efficiency was anyhow automatically chosen as the following step required a laser tracker for establishing the spatial referencing in both cases. In an example of another situation at the manufacturing environment the choice can be different and result in a utilisation of different mobile vehicles 5ml and 5 ms (not shown here) which can be automatically chosen in view of their availability for establishing each of the two temporary spatial referencing systems. Such requirements for spatial references with varying accuracies and/or data points can be applied to many production processes, but require some out-of-the-box thinking compared to the classical approaches with a fixed and static coordinate reference of the product, which sometimes even has to start in the design phase of the product and/or of the manufacturing environment—but can bring severe advantages in a flexible manufacturing environment comprising AGVs.

According to the present invention, the spatial reference cells 20 are task specific, which means they are only established temporarily for a limited duration of a task they are required for and can thereafter be dismissed and substituted by another spatial reference cell for a follow up task. Also, the spatial reference cells according to the invention are task specific in a way that they are established locally, which means relative with respect to all the work piece, components, equipment and/or degrees of freedom which are actually required for the specific task, but not necessarily directly related to the manufacturing environment, to not task-relevant items and/or to a spatial reference cell of a former or a succeeding task. Both, the aspects of being temporary and local are therein automatically derived directly from the task information, in particular comprising data from local edge computation systems at the mobile vehicles. A temporary local spatial reference cell according to the invention is therein not established only by stationary and fixed surveying equipment at the manufacturing environment, but comprises at least one mobile vehicle equipped with metrology and/or surveying equipment, which is independent and in particular not the same mobile vehicle as used for the execution of the task itself.

In particular, in a combination with some stationary sensors and/or cameras, a system according to the invention can be configured to perform measurements on the fly, while the dyad or swarm of mobile vehicles are moving in the manufacturing environment, preferably simultaneously. For example, the present invention can also be considered to relate to a measurement, metrology or surveying system in a manufacturing environment, comprising mobile vehicles equipped with according measurement equipment, for example to form a dynamic quality control system for the manufacturing environment.

In FIG. 4b another embodiment is shown, where a laser scanner and also a laser tracker, each on an independent, autonomous mobile measurement vehicle 5*t* and 5*s* are utilized for a quality control process to inspect the gaps at the car 2. In this example, there is also a spatial referencing unit 13 fixed at the manufacturing environment 1, which locates and/or surveys the mobile vehicle 5*t* and can thereby provide a global spatial reference of the vehicle and/or provide data for navigating the vehicles. As an alternative or additionally, there can also be the reference reflector 39 fixed at the manufacturing environment 1, by which the laser tracker of vehicle 5*t* can establish a highly accurate spatial reference with respect to its environment. Summed up, there are many spatial reference cells available in the shown example, e.g. the manufacturing environment spatial reference 20*a*, a laser tracker based spatial reference cell 20*b*, a laser scanner based spatial reference cell 20*c*, a work piece based spatial reference cell 20*d* and/or a conveyor belt based spatial reference cell 20*e*. According to the invention, those spatial reference cells can be established and linked dynamically in various combinations to temporary form a local spatial reference cell for a specific task. Thereby, a smart and adapted quality control during production can be established, e.g. in form of a dynamic quality control process that can be used in a flexible way based on demand, as in the shown example utilizing mobile laser trackers which are collaborating with other mobile devices, e.g. laser scanners, for a higher measurement flexibility. As those mobile vehicles comprise local computation units, their system can be configured for sending data and sending workflows, also in an abstracted way, wherein a refinement of the abstraction can take place automatically in the delegation chain of the task to different devices and their sub-groups—avoiding details in the overhead control process while still keeping detailed data available on demand. Such can e.g. also comprise an autonomous dispatching of tasks and/or corresponding data as well as corresponding software packages or configurations required for establishing the task.

Figure 5A:
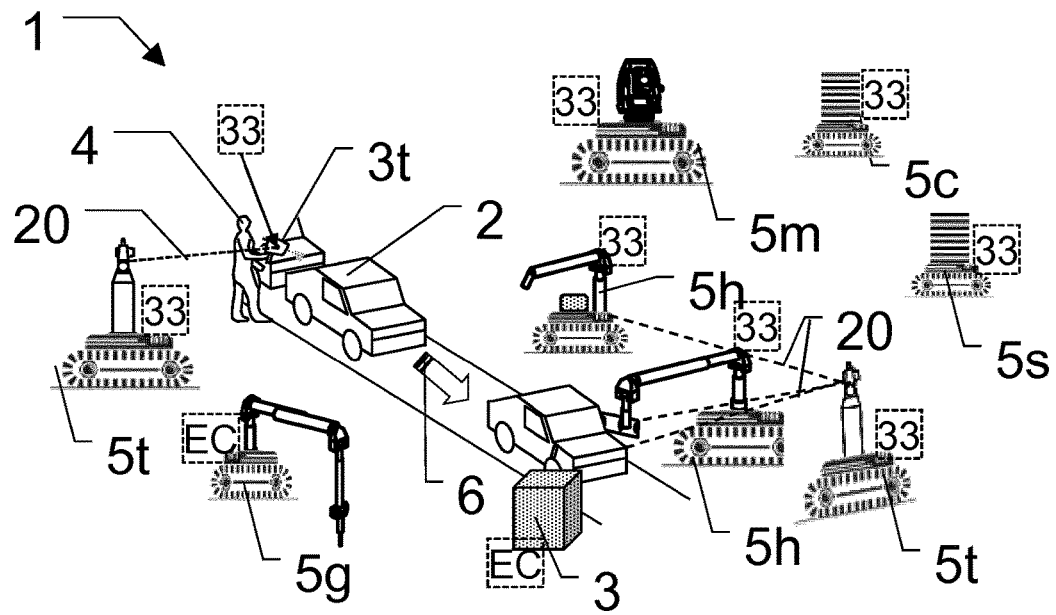
FIG. 5a shows an example of a third embodiment where the present invention is applied.
Figure 5B:
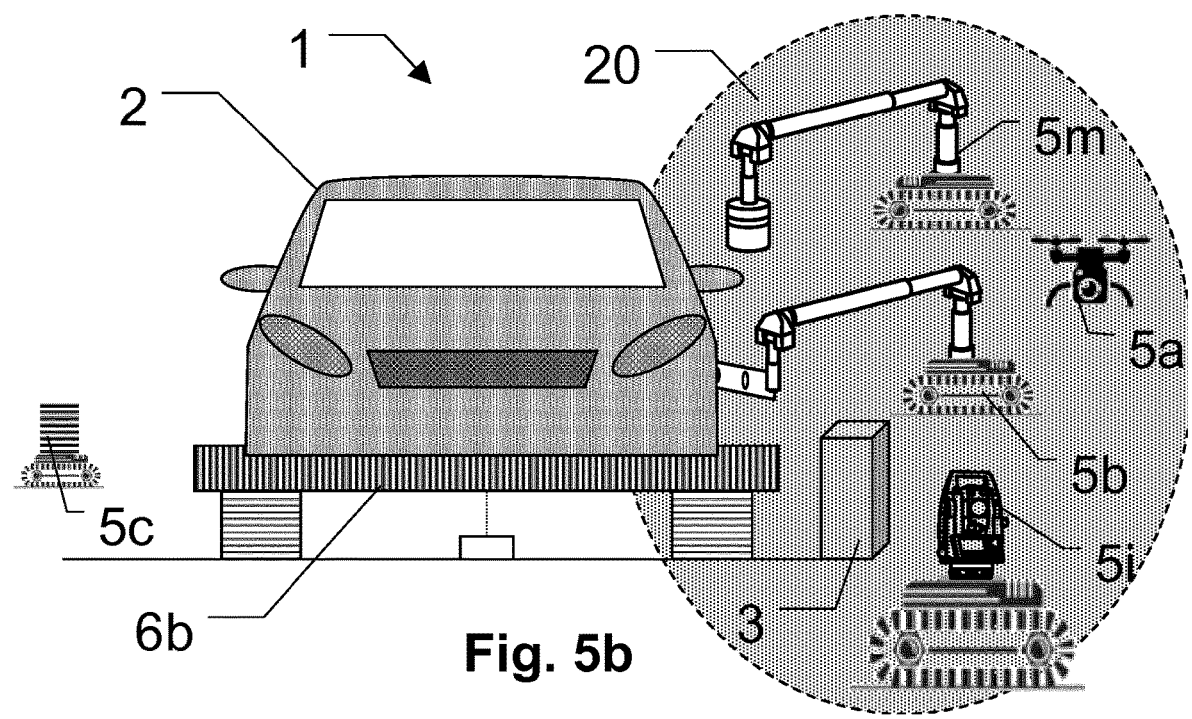
FIG. 5b shows an example of a close up view from the third embodiment of the present invention above.

FIG. 5*a* and FIG. 5*b* are showing examples of a manufacturing environment, wherein FIG. 5*a* gives an overview and FIG. 5*b* shows a detailed view. At the shown manufacturing environment 1, cars are manufactured as work pieces which is done according to the invention by orchestrating a plurality of mobile vehicles 5, which are cooperating to establish the required tasks to manufacture the car 2, and which mobile vehicles 5 are equipped with the here symbolized edge-client computation units 33, which are configured to run edge computation agents. The cars are moved along a conveyor belt, which is in this case not embodied as a classical belt, but with mobile vehicles 6*b* for carrying the work pieces 2 autonomously and not strictly bound to a fixed track in the manufacturing environment 1. Therefore, the work pieces as well as the mobile manufacturing equipment 5 are at least partially moving, wherefore according to the invention mobile measuring vehicles 5*m* are utilized to establish temporary local reference cells 20 for each execution of a task in a dynamic way according to specific requirements of this task. For example, if a manufacturing stage cannot fit a nut, because a bolt applied at a previous stage is missing, defective or damaged, an alarm from the nut-fitting manufacturing stage can automatically result in a deployment of an UAV 5*a* with a camera and the loading of a central- or edge-computation 33 system with information regarding the nut-fitting task, its pre-requirements, previous problems, spatial dependencies, technical drawings and 3D-models, computer rendered images of this manufacturing step and/or of potential fault scenarios, etc., which can in particular be prepared while the UAV is on its way. The UAV 5*a* then supplies images of the problematic scenario, which are then analysed according to the pre-loaded data, e.g. by automatic image recognition and identification functionality for which the computation system is configured. An identified problem is then reported, and if automatically solvable by the systems, e.g. according to a rule-based or learned artificial intelligence system, a solution or further investigation routine is automatically triggered, or human assistance 4 is ordered if automatic solving fails. If human assistance takes place, its executing can be machine learned in order to handle further occurrences automatically. The identified problem is provided, and available or dispensable mobile vehicle resources 5 which provide the capability for the identified further measures are ordered to the location of fault.

Due to the mobility of the mobile vehicle resources 5, an enhanced collaboration can be established. For example, mobile measuring vehicle 5*m*, configured as a mobile laser tracker can collaborate with other, here not shown mobile devices 5*w*. For example, vehicle 5*t* can provide the required exact spatial reference for a mobile bolting-tool vehicle 5*w* to a work piece 2 at a random location in the manufacturing environment 1, which mobile bolting tool vehicle 5*w* is ordered to mend above mentioned problem of a missing bolt in the work piece that was automatically detected by the UAV. Another example can be a collaboration of the mobile laser trackers with e.g. a laser scanner which on its own can only provide a limited, and for the present task insufficient accuracy. Fixedly arranged or rail guided laser scanners working together with laser trackers, which provide a fixed reference cell might be found elsewhere in the industry, but a combination and interaction of a freely movable autonomous laser tracker on a first mobile vehicle and a freely movable autonomous laser scanner on a second mobile vehicle according to the invention can bring additional flexibility and can overcome automation limitations and other constraints like a limited or unfavourable field of view, etc. For instance, if the laser scanner moves out of sight of the laser tracker or the line of sight gets obstructed, the tracker cannot be used to provide the reference anymore.

With the mobile vehicle 5 approach according to the present invention, a dynamic and mobile local frame of reference, can be embodied. For example, both a highly accurate laser tracker as well as a laser scanner (or another devices) are mounted on individual mobile platforms. In this paradigm, and thanks to the global and local orchestration mechanisms described above, the laser trackers and laser scanners can optimally place themselves automatically in such a way that they are close by and advantageously aligned to the work piece that needs to be measured, inspected or worked at.

In an extended embodiment, a mobile dyad or swarm of mobile vehicles can additionally be tracked by fixed sensors, e.g. multiple laser trackers and/or calibrated cameras which are strategically placed at various locations in the manufacturing environment, for example to resolve occlusions or which can also provide a rough absolute frame of reference for the measurements and mobile vehicles to navigate and station themselves.

The present invention can be implemented with machine learning and advanced analytics systems, implemented in hardware and/or software in therefore configured electronic industrial control systems. For example, a quality inspection can be implemented with the mobile vehicles, which can comprise a comparison of point cloud data derived by one or more of the mobile vehicles to nominal model data from a design or CAD file, a statistical evaluation of 3D-scan or measurement data, computer vision for part recognition, completeness check, etc.

Therein, an outcome of such quality inspection can be virtually attached to a specific work piece, for example by pushing the quality inspection data from the one or more edge device which are gathering those data at factory level to an (here not explicitly shown) upper-level control system 7 or to the cloud 8. A system according to the present invention can also be configured to automatically identify the need for further controls or additional checks, and also automatically claim and organize the required additional resources in form of further mobile vehicles comprising more specialized equipment for those additional checks and/mobile vehicles 5 comprising equipment for mending detected defects.

In some embodiments a sensor data fusion can be implemented, in which the collaborative mobile measurement platforms at the mobile vehicles are equipped with a variety of different sensors, in particular for interpreting multimodal sensor data (e.g. with statistical models, machine learning algorithms, etc.). A multimodal system according to the invention can therein also automatically perform a sensor selection based on the task and/or experience gathered in the past which can e.g. be machine learned. Therein, an autonomous cognitive pursuit for more information can be applied to understand a situation at least partially automatically. For example, quality inspection at multiple stations of the manufacturing chain can be established, and if problems are detected, automated algorithms can be applied to iteratively and collaboratively get closer to the root cause. Therein, current sensor data from the mobile vehicles can be used, in particular combined with experience data derived from historical data and/or data from other sites or stations. If needed, an engagement of more mobile vehicles can also be automatically ordered by the system, which can be leveraging the self-defining properties of the mobile vehicles as well as the operations planning capabilities of the command centre 7 or cloud based global planning in the cloud 8 which were shown in the overview in FIG. 1.

While a use of robots in manufacturing environments itself can be considered to be known, the present invention unleashes their ability to process information at multiple points on the edge and thereby generates locally optimized engagement workflows that can create a streamlined quality process which is least intrusive in a high-quality environment. In particular, the present invention increases instrumentation, "on specific relevant points", as an actual situation at the manufacturing environment demands. In prior systems there was no teaching on how to engage multiple actors in form of mobile vehicles 5 in a metrology task, which vehicles are equipped with a plurality of sensors and/or actuators, which comprises utilizing historical big data, human feedback etc. Especially, one aspect of the present invention is to achieve such with a dynamic reference cell 20 approach, which relies on an automated, dynamically and variably on-demand established combination of subsets of multiple mobile vehicles. For example, with at least one mobile laser tracker combined with other mobile devices for measuring, manufacturing, handling, machining, etc., optionally also with additional fixed sensors or reference targets in the manufacturing environment, at the mobile vehicles and/or at the work pieces.

As another example, a mobile device 5 for visual inspection can be deployed with a basic, machine learned and/or rule-based detection algorithm in order to find defects and deviations in the images a product, which are taken by the mobile device. Therein, the edge analytics unit 33 at the mobile device 5 can be configured by a basic set of algorithms and can also comprise or load specifics of the visual inspection system of this specific device. This basic set can then be supplemented, e.g. involving a transfer learning approach, by specific algorithms for the specific product or machine to be inspected. Those specific algorithms can then be loaded on demand, for example deployed by an upper level management system to the edge system, requested by the edge system from a fog- or cloud-storage system 7 or 8. The specific algorithms can therein not only comprise routines for inspecting the whole product or machine, but can also comprise routines for inspecting atomic inspection elements (like holes, screws, plain surfaces, angles, corners, dimensions, colors, roughness, . . . ) which are then automatically orchestrated to a configuration required for this specific product to be inspected. Such an orchestration can therein either be done at the edge client system 33 or at the cloud system 8. The routines for inspecting atomic inspection elements can preferably be stored at the higher-level fog- 7 or cloud-system 8, whereby those are globally available and can be enhanced, updated centrally. For example, one of the mobile inspection devices 5 can provide data from its real-world inspection, by which one or more of the routines for an atomic inspection element can be re-trained, enhanced or reinforced—in particular in a cloud computation system 8 with dedicated computational elements for training an artificial intelligence system. Yet if the edge computation system detects and/or identifies some anomaly during its inspection or if it only achieves a low confidence in its inspection results, the edge-system can automatically delegate the present inspection task to a higher instance. For example, the edge system 33 can automatically initiate an orchestration of an inspection container configured for the present inspection task at a higher order computational instance which has more capabilities. Such a higher-level inspection can e.g. be initiated as a container-module at a cloud computation system 8, which container is provided with the image from the visual inspection system (and optionally also the preliminary results from the edge system analysis), in order to further investigate on the potential issue. While the edge system 33 operates substantially in real time, this further investigation might be done in non-real-time at a remote high-performance computation system 8. Such an inspection container can then automatically provide an enhanced solution back of the inspection to the edge systems, automatically decide to enhance the basic algorithms which are deployed to the edge systems, e.g. by employing transfer learning approaches, or the inspection container can further delegate such a task to a human operator 4 for final decision or approval.

For example, a production machine has a sudden increase of energy consumption above its normal level for the present task. A software agent at the edge-computation system 33 of the machine 3 detects such and automatically dispatches an according information about this anomaly to a higher-level factory control system. The control system thereupon automatically requests historical data of this issue in order to locally ensure and analyze this issue in depth by cloud analytics applied to a big data model and also for logging the according issue in the cloud 8. It also derives the potentially affected products and marks them virtually with a ticket number for this issue in order to track those products down, in case the issue has impact on the product quality. As the increase of the energy consumption is presently not critical for this production machine, the edge client 33 at the machine 3 is automatically configured to report again on a further increase above a higher threshold than the presently reported one (or on a normalization) and to continue its machining. It also automatically sends out a presently idle inspection UAV with a visual inspection system, to precautionary survey the production machine 3. The UAV 5a autonomously navigates to the production machine and takes pictures. Those pictures which are returned from the inspection UAV are then processed by an image recognition and classification system, which is at least partially trained on rendered images of a virtual model of the production machine and the virtual representation of the product presently machined—wherefore a specific cloud service is automatically instantiated on a high-performance server with hardware optimized for learning deep neural network parameters, e.g. GPUs or TPUs. As both, the analysis of the historical machine performance data, as well as the picture analysis by the detection and classification algorithms result no significantly reasonable cause, a decision tree of a machine fault analysis algorithm then automatically determines that any additionally consumed energy has to be manifested somewhere, and that heat is a common manifestation. Therefore, the system automatically releases the visual inspection UAV of its duty (which then autonomously returns to its charging base) and negotiates with one of the mobile vehicles 5 in the manufacturing environment that is equipped with a thermal imager. As this thermal imager vehicle 5 is presently occupied and the state of the production machine is not classified to be critical but could get critical in near future if unattended, the vehicle is scheduled to autonomously navigate to the production machine at its next availability timeslot and to report back thermal images from multiple views of the production machine. The reported thermal images are then analyzed by an accordingly configured cloud service for classifying thermal images—which reports back some heat source at a certain location in some of the thermal images. The system then automatically negotiates with the edge client 33 at the thermal imager vehicle for a spatial reference of the thermal images with respect to the machine which was derived according to the invention. Thereby the heat source is spatially referenced to a certain portion of the production machine, which is according to a digital model of the production machine at the end of a spindle, about where a bearing is located. From previous encounters there was information learned that bearings can get worn and that such can result in the present symptoms with a high likelihood—and that the only resolution is to replace the bearing. The enterprise resource planning system (ERP) is automatically informed that an outage of this production machine resource is due, which then calculates a modified production plan in which the impact to the overall productivity of the factory is minimized. The edge client 33 at the production machine automatically wraps the findings of the worn bearing into an automated service request to its manufacturer and provides a scheduled service appointment to the upper level system which forwards this to the ERP system. A human operator 4 getting a summary of all those events on his dashboard analytics application, then decides to let the production machine run at lower speed until the scheduled service appointment or until a certain energy consumption threshold is met, which information is then automatically deployed to the involved edge-, higher level- and ERP-system, for each converted into a suitable data representation.

Figure 6:
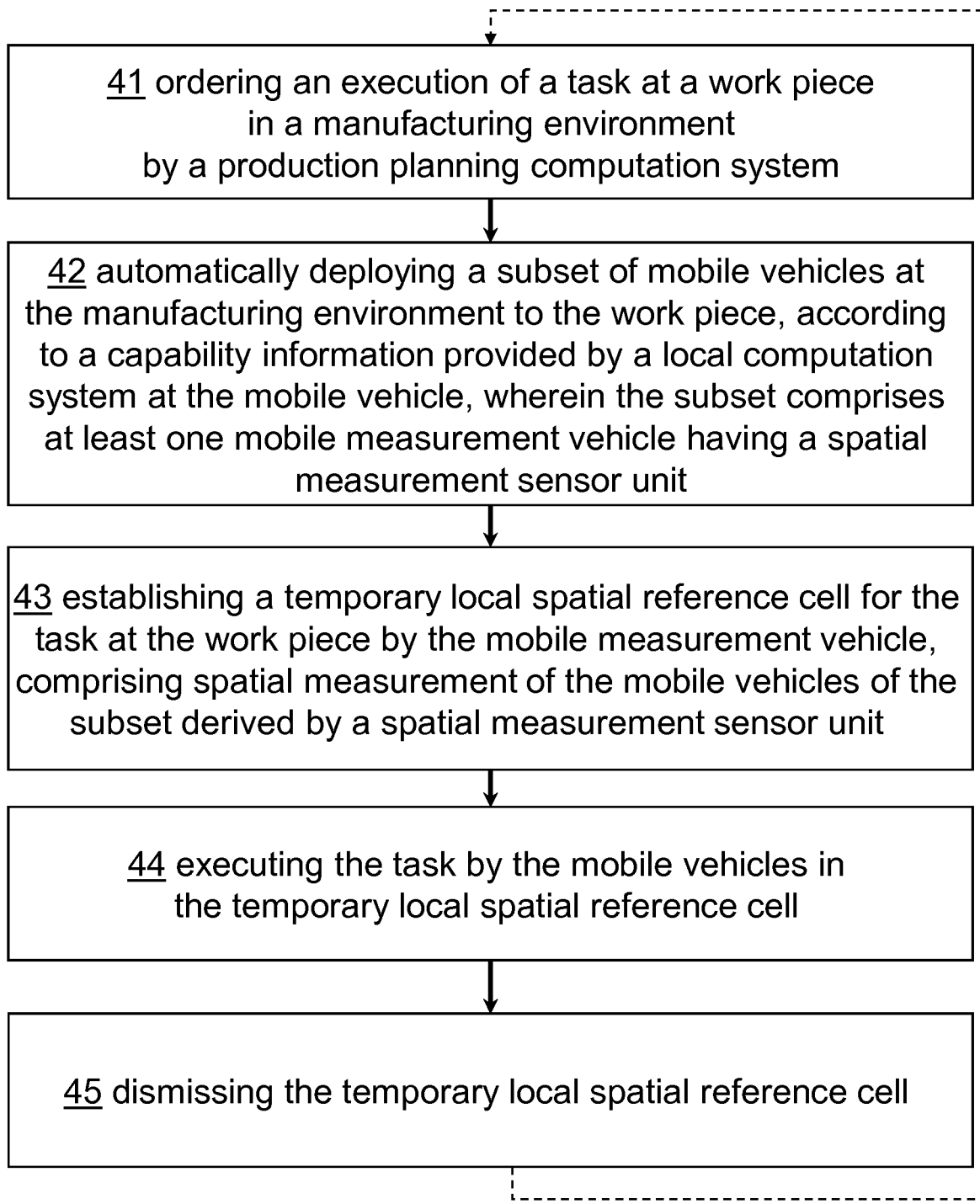
FIG. 6 shows an example of a first block diagram illustrating the invention.

FIG. 6 shows an example of a simplified flow diagram of an embodiment of the present invention.

Box 41 symbolizes, an ordering of an executing of a task at a work piece in a manufacturing environment by a production planning computation system.

Box 42 symbolizes an automatic deployment of a subset of mobile vehicles at the manufacturing environment to the work piece, which is done automatically according to a capability information provided by a local computation system at the mobile vehicle. Therein, the subset comprises at least one mobile measurement vehicle having a spatial measurement sensor unit.

Box 43 symbolizes a setup of a temporary local spatial reference cell for the task at the work piece by the mobile measurement vehicle. The temporary local spatial reference cell comprising spatial measuring of the mobile vehicles of the subset derived by a spatial measurement sensor unit. The temporary local spatial reference cell is established specifically for the task, in particular depending on an individual duration of the task, an individual spatial accuracy required for the task and an individual local range required for the task, which are preferably derived automatically from an information of the ordered task.

Box 44 symbolizes an execution of the task by the mobile vehicles of the subset in the temporary local spatial reference cell.

Box 45 symbolizes a dismissal the temporary local spatial reference cell when the task is done.

Figure 7:
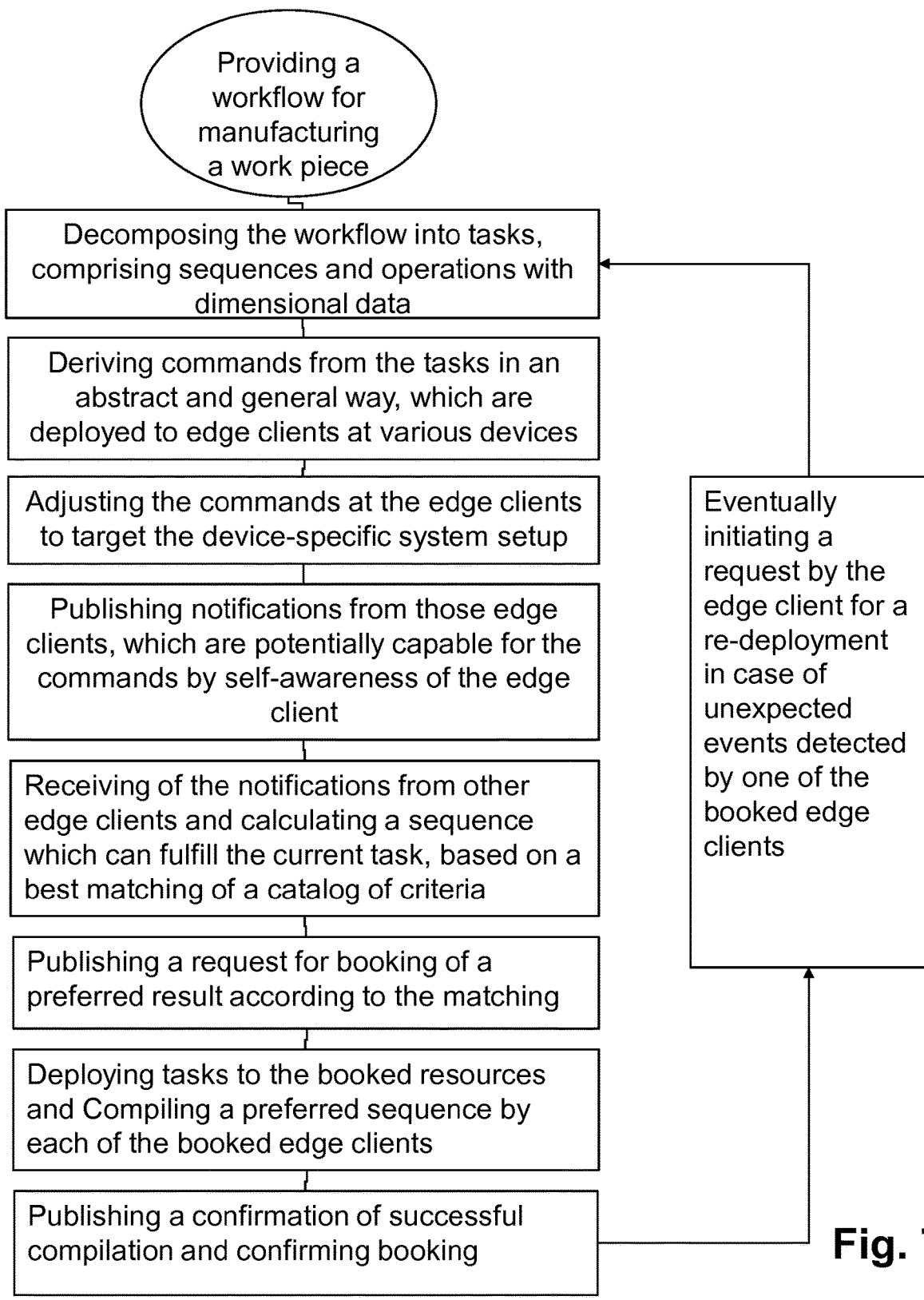
FIG. 7 shows an example of a second block diagram illustrating the invention.

FIG. 7 shows an example of a simplified flow diagram of an embodiment of the present invention. Such an embodiment of a deployment can for example comprise at least some of the following.

Decomposing a provided workflow for manufacturing of the work piece into tasks, which task are comprising sequences, logical operations, properties of operations, outcome data, required input data, dimensional data, dimensional properties, etc. Therein, such a workflow can for example be, preferably automatically, derived from a CAD (Computer Aided Design)/CAM (Computer Aided Manufacturing) System in which the work piece is defined for its manufacturing. This workflow is provided in the manufacturing environment for the work piece.

Deriving commands in a device-independent, abstract and general way from the tasks of the workflow, which are deployed to edge clients at various devices in the manufacturing environment via a manufacturing data network. Adjusting the commands at the edge clients to target the device-specific system setup, e.g. the motor specific system (e.g. from stepper to piezo), the specific sensor system, the specific geometric setup of the system, etc. The edge client can therefore comprise or be deployed with at least one edge analytics software agent configured adjust the general commands to the specific device of the edge client Therein the edge client can derive a capability of the of the device-specific system setup with the commands by a self-reflection edge analytics agent that is comprised at or deployed to the edge client.

Publishing notifications from those edge clients, which are potentially capable and/or available for the commands of the deployed task, for example by comparing a self-awareness of the edge client (such as a list of capabilities and/or parameters of the apparatus the edge client is applied to) with requirements and/or parameters from the task of from a subset of the task.

Receiving of the notifications from other edge clients and calculating a sequence which can fulfill the current task, preferably based on a best matching of a catalog of criteria comprising capability, time, availability, costs, etc. Such can comprise a verifying if a sequence is able to be changed, e.g.

for less positioning movements and quicker execution, e.g. with a, preferably parallel, calculation or simulation of multiple alternatives and comparing the results based at least one or a rated mixture of criteria like, energy consumption, execution time, costs, wear, requirement fulfillment, resource conflicts, continuity in usage, pre- and post-usage of the resource at the same location and/or task, statistics of a success or failure rate of the alternatives for this specific task, etc.

Publishing a binding request booking of a preferred result from the verifying, verifying and confirming the published booking for conflicts with other binding and/or non-binding booking requests in the manufacturing environment by each edge computation unit involved in the booking.

Deploying tasks of the workflow to the booked resources.

Compiling a preferred sequence from the verifying to a vehicle specific set of instructions by each of the edge clients at those mobile vehicles that have been booked.

Publishing a confirmation of successful compilation of the deployed tasks of the workflow and confirming of the binding booking to the other mobile vehicles by the edge client.

Eventually initiating a request by the edge client for a re-deployment by a restarting above procedure in case of unexpected events detected by one of the booked edge clients which influence the decision basis for published confirmation.

The workflow for the manufacturing of the work piece is provided as a digital definition of the work piece to the manufacturing environment, for example from a CAD/CAM system.

The workflow is then, preferably automatically by a computation unit, analyzed for tasks, instructions or micro tasks to be executed to result in the workflow, like movement of an objects, measuring of specific points at an objects, relative positioning of two objects (like work piece vs environment, work piece vs object, work piece vs tool or machine, work piece vs mobile vehicle, etc.). A workflow can be considered to comprise a hierarchy of tasks. Such a task often comprises a spatial or dimensional requirement, either naturally and explicitly by the task (like when mounting an object at a specific location to a work piece or the like) or implicitly (like when a measurement of the work piece is required, which measurement can only be established from a certain side or location range within respect to the object to avoid collisions of a measurement tool, obstruction of a measurement beam or interference with a tool, or the like). Those requirements are therein highly individual for each of the tasks, in particular in view of accuracy, degrees of freedom, involved machinery, etc.) According to the present invention, edge client computation units are configured to compute a filtering of task request at recipients in their local edge client computation units, in particular comprising an extracting of the required spatial accuracy from the task and comparing with the required spatial accuracy with the accuracy achievable with local measurement units at the mobile vehicle. Additionally, also data from the manufacturing environment can be evaluated by the edge client units, which can for example comprise meta information from devices and vehicles that are present therein, like at least one of utilization and availability in overall workflow, importance in work piece, spatial closeness, operational states, substitutability in workflow, etc. The edge computation units can therein also request environment information on alternative devices and mobile vehicles that are co-working in the manufacturing environment, preferably also comprising an edge computation unit of their own. The edge clients can therein request edge analytics data from its environment, e.g. information on utilization and future tasks of alternative devices and vehicles. Such can e.g. be established in a bottom up hierarchy, comprising initially low levels direct requests in-between vehicles. In case no low level solution can be computed—a requests from each vehicle up to a higher hierarchic order can be established, for example to a higher level manufacturing control system or up to a human manufacturing controller. Such an edge computation systems and therein used edge analytic software agents, which are preferably dynamically deployed to the edge clients in the manufacturing environment hierarchy can provide an embodiment of so called self-awareness.

As a result of such a self-awareness, the edge client can compute a level of confidence to execute the current task in time, which can range from being technical incapable for this task, to being over-qualified and/or from being available right away to having an expected delay time until availability. In the present invention concerning an establishing of a temporary spatial reference frame for a specific task by mobile measurement vehicles, such a level of confidence primarily comprises achievability of the required dimensional accuracy and measurement capabilities, and potentially also availability in time. Such level of confidence can be communicated in-between the edge clients from one or more of the edge clients. Based in such a level of confidence, a voting of the edge client with the best level of confidence, which can be done as an embodiment of self-awareness e.g. by comparing of information from other edge clients. For example, a self-voting and announcing of the self-voting by the edge client can be established by the one edge client calculating the highest level of confidence, optionally comprising a recommending of one or more alternative apparatus for the current task.

Such a self-voting can optionally be monitored, verified and approved or overruled by a higher level manufacturing control system, e.g. if capability and timeliness of the given mobile vehicle is not sufficient. Thereupon the higher level manufacturing control system can decide on mobile vehicles to carry out the task or alternatively the higher level system can deploy an additional rule or criteria to be included in the calculating of the level of confidence, which can e.g. be deployed as an edge analytics software agent or a configuration parameter for an existing agent (e.g. an exclusion of a specific mobile vehicle from the consideration). In later case, the edge clients will restart their calculation of level of confidence and derive an alternate solution at the lower level.

The level of confidence can e.g. comprise at least one of a, request geospatial availability of apparatuses, request uptime and probability of availability to receive a dynamic workflow, (e.g. based on apparatuses system conditions, which can include battery level, assigned tasks, low confidence of predicted problem in the timeframe), request the given workflow and task-backlog from apparatuses, estimated time of execution of these tasks (including past experience on such given tasks), whether such a system is operated by a human or purely driven by deployed workflows (in the latter case, priorities can be enforced, thus more likely to be available), main properties, which are at minimum required to perform the current task like minimum angular accuracy, minimum positioning accuracy, minimum distance accuracy, minimum measurement rate (for angles, inclination, distance etc.), measurement capabilities according to used targets (e.g. laser class, camera resolution and field of view, sample rate, frame rate)

The best sub-workflow for the specific task is then deployed to the therein selected mobile vehicles in all of its details, which will confirm execution of given workflow right now or at which point in the future. Each edge client analyzes the workflow to be done at the work piece e.g. movement instructions to a work piece, measurement rate, accuracy requirements on positioning (X, Y, Z), duration of execution, probability or errors which can occur, human interaction required or not, etc.

A core of the present invention is therein an technical solution which is providing an establishing of a temporary spatial reference cell only, which is specifically designed for a current task. This in particular means a reference of only those objects which are actually involved in the current tasks, preferably without any other components and not requiring an absolute reference in the overall manufacturing environment and preferably without being referenced before the current task is scheduled for execution nor after the current task has finished. A skilled person is aware of the fact that details, which are here shown and explained with respect to different embodiments, can also be combined with details from other embodiments and in other permutations in the sense of the invention.

What is claimed is:

1. A system comprising multiple mobile vehicles configured to move autonomously in a smart factory environment at which a work piece is processed, each of the mobile vehicles comprising:
    a spatial localization system for deriving a location of the mobile vehicle in the manufacturing environment;
    an autonomous navigation and propulsion unit configured for providing mobility of the mobile vehicle in the manufacturing environment;
    a communication interface providing a data link to at least one other mobile vehicle or to a fog or cloud computation and storage system; and
    an edge computation unit for a local data analysis at the mobile vehicle by intelligent, deployable edge analytics software agents and configured to interact via the communication interface,
    wherein an automatic deployment of a workflow information for the processing of the work-piece for the mobile vehicles is established via the communication interface, which workflow comprises at least one current task,
    wherein at least one of the mobile vehicles is configured as a mobile measurement vehicle comprising at least one spatial measurement sensor unit, which mobile measurement vehicle is configured to autonomously navigate to a location in the smart factory environment and to establish a temporary instance of a local spatial reference cell in the smart factory environment, the temporary instance of the spatial reference cell comprising the work piece and at least one of the mobile vehicles and being established with data from the at least one spatial measurement sensor unit,
    wherein the temporary instance of the spatial reference cell is established temporarily for a limited time of a duration of a current task that has to be established at the work piece, and wherein the temporary instance of the spatial reference cell is established according to individual spatial requirements derived from the current task that has to be established based on capabilities of the mobile measurement vehicle, which are derived by a self-reflection and/or self-awareness of its edge computation unit.

2. The system according to claim 1, wherein a transfer learning mechanism is established among the edge computation unit at the at least one mobile vehicle and an edge computation unit at a second mobile vehicle, or among the edge computation unit at the at least one mobile vehicles and the fog or cloud computation system.

3. The system according to claim 1, wherein the establishing of the temporary instance of the spatial reference cell comprises:
    identifying of one or more persons that are present in a range of the spatial reference cell or persons that are assigned to at least one object that is present in the range of the spatial reference cell or an unrequested mobile vehicle that is present in the range of the spatial reference cell, and
    sending a notification to an electronic device assigned to each of the identified persons or to the unrequested mobile vehicle.

4. The system according to claim 1, wherein the temporary spatial reference cell comprises a measured spatial information of a spatial reference in the manufacturing environment according to an additionally fixed spatial measurement sensor or an optical reference mark at the manufacturing environment.

5. The system according to claim 1, wherein the temporary spatial reference cell is dynamically established by the at least one mobile measurement vehicle, and comprises a measured spatial information of at least one mobile working vehicles that comprises at least one actuator tool or machining tool and a measured spatial information of the work piece.

6. The system according to claim 1, wherein the at least one mobile measurement vehicle is an unmanned aerial vehicle and the at least one mobile measurement vehicle is an autonomous ground vehicle (AGV).

7. The system according to claim 1, wherein information derived at the at least one mobile vehicle is locally processed at the edge computation unit by a stream analytics agent, wherein a limited portion of the information which is significant for real-time operation of the mobile vehicle is processed locally at the mobile vehicle by an edge analytics agent, and
    wherein substantially all or a defined subset of the information is transferred into the cloud computation system to be processed by a cloud analytics agent at the cloud computation system.

8. The system according to claim 1, wherein the system comprises at least a first and a second measuring vehicle comprising different types of spatial measurement sensor units, and wherein the first measuring vehicle establishes the temporary local spatial referencing cell comprising spatial measurement information of the second measuring vehicle and of the work piece or the manufacturing environment, and wherein measurement results of the spatial measurement sensor unit at the second mobile measuring vehicle is spatially referenced according to the temporary local spatial referencing cell.

9. A method for manufacturing a work piece at a manufacturing environment by a system comprising at least one autonomously moving mobile vehicle, the method comprising:
    autonomous localization and navigation of the at least one mobile vehicle in the manufacturing environment by a spatial localization system and a propulsion or mobile driving unit; and
    establishing a data link by a local edge computation unit with a communication interface to at least one other mobile vehicle or to a fog- or cloud- computation and storage system, wherein the at least one mobile vehicle is configured as a mobile measuring vehicle comprising at least one spatial measuring sensor unit, and wherein the mobile measuring vehicle temporarily establishes an instance of a local spatial reference cell, the establishing comprising data from the at least one spatial measuring sensor unit of the mobile measurement vehicle, wherein the establishing is temporally limited for a duration of a current task that has to be established at the work piece and which spatial reference cell is thereafter dismissed, and wherein the establishing of the temporary instance of a local spatial reference cell is done with an individual level of spatial accuracy and an individual local range, which individual level is dynamically defined by an accuracy requirement of the current task that has to be established based on capabilities of the mobile measurement vehicle, which are derived by a self-reflection and/or self-awareness of its edge computation unit.

10. The method according to claim 9, further comprising:
automatically handing over or re-establishing of the local spatial reference cell from the at least one autonomously moving mobile vehicle to an at least one second autonomously moving mobile vehicle in case of a failing of the at least one autonomously moving mobile vehicle to establish or maintain the local spatial reference cell.

11. The method according to claim 9, wherein the local edge computation unit is automatically calculating the individual level of spatial accuracy and the individual local range from an information dataset of the current task derived from a manufacturing controlling computation unit via the communication interface.

12. The method according to claim 9, further comprising:
automatically evaluating the current task information by the local edge computation unit at the mobile vehicles based on a workflow information and a current state of the work-piece with a breaking down of the workflow information into a series of atomic tasks.

13. The method according to claim 9, further comprising:
automatically evaluating of at least one key performance indicator (KPI) in the manufacturing of the work piece; configuring of the temporal local spatial reference cell; and enabling of an execution of the current task.

14. An autonomous mobile vehicle comprising a spatial measurement sensor unit and a local edge computation unit configured for automatically establishing a temporary local spatial reference cell for at least one further mobile vehicle in a manufacturing environment based on an information on a task to be established, the autonomous mobile vehicle being configured to perform the method according to claim 9.

15. A computer program product with non-transitory, tangible program code being stored on a machine readable medium, the program code being configured as an edge client agent to be run at an edge client unit at a mobile vehicle in a manufacturing environment to:

automatically derive a temporary local spatial reference cell for current task in a manufacturing process, with a computing of required accuracy and local dependency from the current task, and to automatically command and configure a subset of mobile measurement vehicles and mobile working vehicles at a manufacturing environment to establish the temporary local spatial reference cell and to execute the current task while the temporary local spatial reference cell is established; and establish a network-link to a cloud agent running at a cloud computation unit.

16. The system according to claim 1, wherein the workflow is provided as a digital information to the manufacturing system and comprises a series of tasks required for the manufacturing of the work piece.

17. The system according to claim 1, wherein the spatial reference cell is comprising a dimensional reference of only the work piece and an object, tool or machine that is defined in the current task to interact with the work piece and is only established temporarily during the time of execution of the current task.

18. The system according to claim 1, wherein the spatial reference cell is established by the mobile measurement vehicle, which is separated from the work piece and from another mobile vehicle or machine that is configured to execute the current task on the work piece.

* * * * *